United States Patent
Tanae et al.

(10) Patent No.: US 11,592,661 B2
(45) Date of Patent: Feb. 28, 2023

(54) FILTER UNIT, FILTER SELECTION METHOD, AND IMAGING DEVICE

(71) Applicant: SONY CORPORATION, Tokyo (JP)

(72) Inventors: Takuma Tanae, Kanagawa (JP); Hideki Nakamaru, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 97 days.

(21) Appl. No.: 16/964,592

(22) PCT Filed: Jan. 25, 2019

(86) PCT No.: PCT/JP2019/002403
§ 371 (c)(1),
(2) Date: Jul. 23, 2020

(87) PCT Pub. No.: WO2019/155908
PCT Pub. Date: Aug. 15, 2019

(65) Prior Publication Data
US 2021/0041685 A1 Feb. 11, 2021

(30) Foreign Application Priority Data
Feb. 9, 2018 (JP) .............................. JP2018-021662

(51) Int. Cl.
*G02B 26/02* (2006.01)
*G02B 5/20* (2006.01)
(Continued)

(52) U.S. Cl.
CPC ........... *G02B 26/023* (2013.01); *G02B 5/205* (2013.01); *G02B 26/008* (2013.01); *G02B 27/281* (2013.01); *G02B 27/288* (2013.01)

(58) Field of Classification Search
CPC .... G02B 26/023; G02B 26/008; G02B 5/205; G02B 27/281; G02B 27/288
(Continued)

(56) References Cited

U.S. PATENT DOCUMENTS 5,949,518 A * 9/1999 Belmares ................. C09D 5/32
351/159.57
6,373,073 B1 4/2002 Clancy et al.
(Continued)

FOREIGN PATENT DOCUMENTS

| CN | 1542533 A | 11/2004 |
| CN | 103502885 A | 1/2014 |

(Continued)

OTHER PUBLICATIONS

Office Action for CN Patent Application No. 201980011388.6, dated Aug. 3, 2021, 13 pages of Office Action and 19 pages of English Translation.

(Continued)

*Primary Examiner* — Marin Pichler
*Assistant Examiner* — Mitchell T Oestreich
(74) *Attorney, Agent, or Firm* — Chip Law Group

(57) ABSTRACT

The present disclosure relates to a filter unit, a filter selection method, and an imaging device that allow continuously changing a transmittance of an ND filter and switching between filters to be performed more easily. A disk provided with a plurality of filters including an ND filter having a continuously variable transmittance is rotated to cause a filter corresponding to a rotational orientation of the disk among the plurality of filters provided on the disk to be arranged on an optical axis of incident light toward an image sensor. The present disclosure can be applied to, for example, a filter unit, an imaging device, electronic equipment, a filter selection method, a program, or the like.

23 Claims, 19 Drawing Sheets

(51) Int. Cl.
*G02B 26/00* (2006.01)
*G02B 27/28* (2006.01)

(58) Field of Classification Search
USPC .......................................................... 359/888
See application file for complete search history.

(56) References Cited

U.S. PATENT DOCUMENTS

| | | | |
|---|---|---|---|
| 6,452,732 B1 | 9/2002 | Okada et al. | |
| 8,801,305 B2 | 8/2014 | Yasugi et al. | |
| 2002/0012060 A1 | 1/2002 | High et al. | |
| 2013/0021613 A1 | 1/2013 | Furxhi et al. | |
| 2014/0028991 A1* | 1/2014 | Yasugi | G02B 27/281 |
| | | | 355/71 |

FOREIGN PATENT DOCUMENTS

| | | |
|---|---|---|
| CN | 204759006 U | 11/2015 |
| CN | 105388610 A | 3/2016 |
| CN | 107290834 A | 10/2017 |
| EP | 3147640 A1 | 3/2017 |
| JP | 03-230132 A | 10/1991 |
| JP | 2001-042380 A | 2/2001 |
| JP | 2004-333553 A | 11/2004 |
| JP | 2005-020416 A | 1/2005 |
| JP | 2006-300971 A | 11/2006 |
| JP | 2011-070150 A | 4/2011 |
| JP | 2012-220710 A | 11/2012 |
| JP | 2016-142772 A | 8/2016 |
| WO | 2013/084489 A1 | 6/2013 |
| WO | 2013/146051 A1 | 10/2013 |

OTHER PUBLICATIONS

International Search Report and Written Opinion of PCT Application No. PCT/JP2019/002403, dated Apr. 16, 2019, 10 pages of ISRWO.

Office Action for CN Patent Application No. 201980011388.6 dated Mar. 9, 2022, 07 pages of English Translation and 07 pages of Office Action.

Office Action for JP Patent Application No. 2019-570675, dated Aug. 23, 2022, 06 pages of English Translation and 07 pages of Office Action.

* cited by examiner

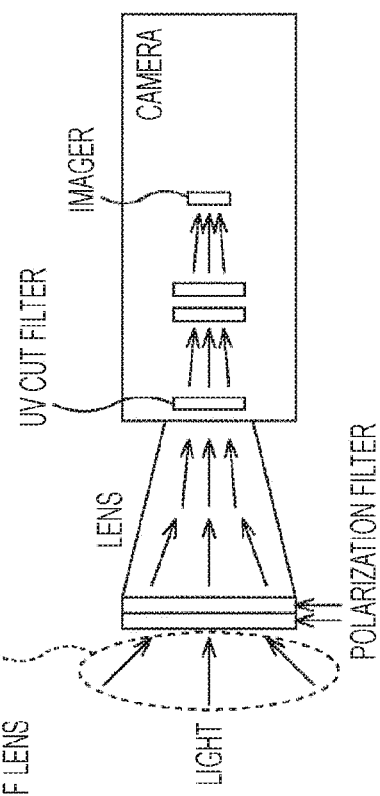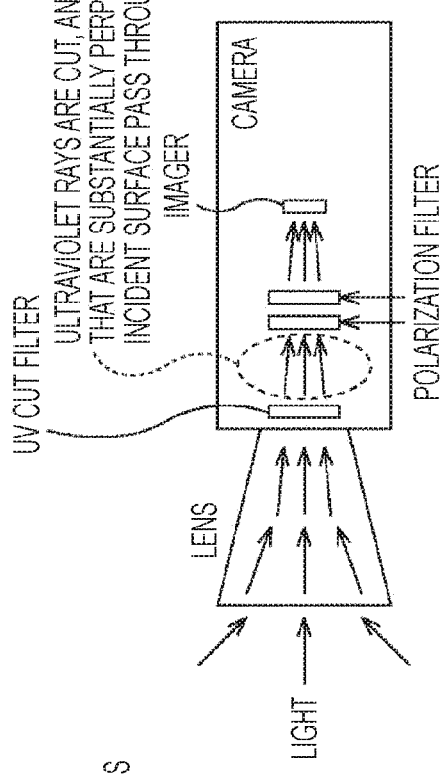

FILTER UNIT, FILTER SELECTION METHOD, AND IMAGING DEVICE

CROSS REFERENCE TO RELATED APPLICATIONS

This application is a U.S. National Phase of International Patent Application No. PCT/JP2019/002403 filed on Jan. 25, 2019, which claims priority benefit of Japanese Patent Application No. JP 2018-021662 filed in the Japan Patent Office on Feb. 9, 2018. Each of the above-referenced applications is hereby incorporated herein by reference in its entirety.

TECHNICAL FIELD

The present disclosure relates to a filter unit, a filter selection method, and an imaging device, and more particularly, to a filter unit, a filter selection method, and an imaging device that allow continuously changing a transmittance of an ND filter and switching between filters to be performed more easily.

BACKGROUND ART

Conventionally, there has been a neutral density (ND) filter that changes a light transmittance in stages by rotation of a glass plate (see, for example, Patent Document 1).

CITATION LIST

Patent Document

Patent Document 1: Japanese Patent Application Laid-Open No. 2011-70150

SUMMARY OF THE INVENTION

Problems to be Solved by the Invention

However, in the case of the ND filter described in Patent Document 1, it has been difficult to continuously change the light transmittance. Furthermore, it has been difficult to switch the ND filter to a filter other than an ND filter.

The present disclosure has been made in view of such a situation, and facilitates continuously changing a transmittance of an ND filter and switching between filters.

Solutions to Problems

A filter unit according to one aspect of the present technology includes a disk provided with a plurality of filters including an ND filter having a continuously variable transmittance, in which a filter corresponding to a rotational orientation of the disk among the plurality of filters provided on the disk is arranged on an optical axis of incident light toward an image sensor.

A filter selection method according to another aspect of the present technology includes rotating a disk provided with a plurality of filters including an ND filter having a continuously variable transmittance to cause a filter corresponding to a rotational orientation of the disk among the plurality of filters provided on the disk to be arranged on an optical axis of incident light toward an image sensor.

An imaging device according to still another aspect of the present technology includes an imaging unit that captures an image of a subject, and a filter unit having a disk provided with a plurality of filters including an ND filter having a continuously variable transmittance, in which a filter corresponding to a rotational orientation of the disk among the plurality of filters provided on the disk is arranged on an optical axis of incident light toward the imaging unit.

In the filter unit according to the one aspect of the present technology, among the plurality of filters including the ND filter having the continuously variable transmittance provided on the disk, a filter corresponding to the rotational orientation of the disk is arranged on the optical axis of the incident light toward the image sensor.

In the filter selection method according to the other aspect of the present technology, the disk provided with the plurality of filters including the ND filter having the continuously variable transmittance is rotated to cause a filter corresponding to the rotational orientation of the disk among the plurality of filters provided on the disk to be arranged on the optical axis of the incident light toward the image sensor.

In the imaging device according to still another aspect of the present technology, an image of a subject is captured, and among the plurality of filters including the ND filter having the continuously variable transmittance provided on the disk, a filter corresponding to the rotational orientation of the disk is arranged on the optical axis of the incident light toward the imaging unit.

Effects of the Invention

According to the present disclosure, a filter arrangement can be controlled. In particular, the transmittance of the ND filter can be continuously changed and filters can be switched more easily.

BRIEF DESCRIPTION OF DRAWINGS

FIGS. 12A and 12B are diagrams illustrating an arrangement example of a filter unit.

MODE FOR CARRYING OUT THE INVENTION

Modes for carrying out the present disclosure (hereinafter referred to as "embodiments") will be described below. Note that the description will be made in the order below.

1. ND filter
2. First embodiment (filter unit 1)
3. Second embodiment (filter unit 2)
4. Third embodiment (filter unit 3)
5. Fourth embodiment (imaging device)
6. Notes <1. Nd Filter>
<Luminance Adjustment>

Conventionally, as a method for adjusting a luminance of a camera, there has been an adjustment method that uses, for example, an aperture, a gain, an electronic shutter, or the like. However, changing the aperture causes a change in depth of field, and there has been a possibility that controlling the depth of field becomes difficult. Furthermore, there has been a possibility that reducing the aperture causes a phenomenon (so-called small aperture blur) in which an image quality lacks sharpness and an image is blurred as a whole due to a diffraction phenomenon of light (that is, a resolution decreases). Particularly in recent years, resolutions of cameras have been increasing to 4K, 8K, and the like, and an influence of a decrease in resolution keeps increasing.

Furthermore, particularly in a case of reducing a brightness, there has been a possibility that changing the gain may result in a reduction in maximum luminance that can be detected (that is, a dynamic range of received light luminance). Furthermore, in a case of capturing an image of a moving subject, there has been a possibility that changing the electronic shutter causes a change in the amount of blurring (subjective image quality such as lack of smoothness), which makes it difficult to control the amount of blurring.

Thus, an optical filter called a neutral density (ND) filter that reduces light intensity has been devised. This ND filter can be used to suppress the influence as described above. However, since a normal ND filter has fixed transmittance characteristics, it has been difficult to continuously change the transmittance.

When capturing an image of a subject, immediate (real-time) luminance adjustment is required in some cases. For example, in a case of a live camera that broadcasts or delivers captured images immediately (in real time), immediate response to changes in the subject or environment is required. For example, in a case of moving from an indoor location to an outdoor location while capturing an image, it is necessary to immediately adjust the imaging luminance in accordance with a change in the luminance of the subject or the surrounding environment.

Figure 1:
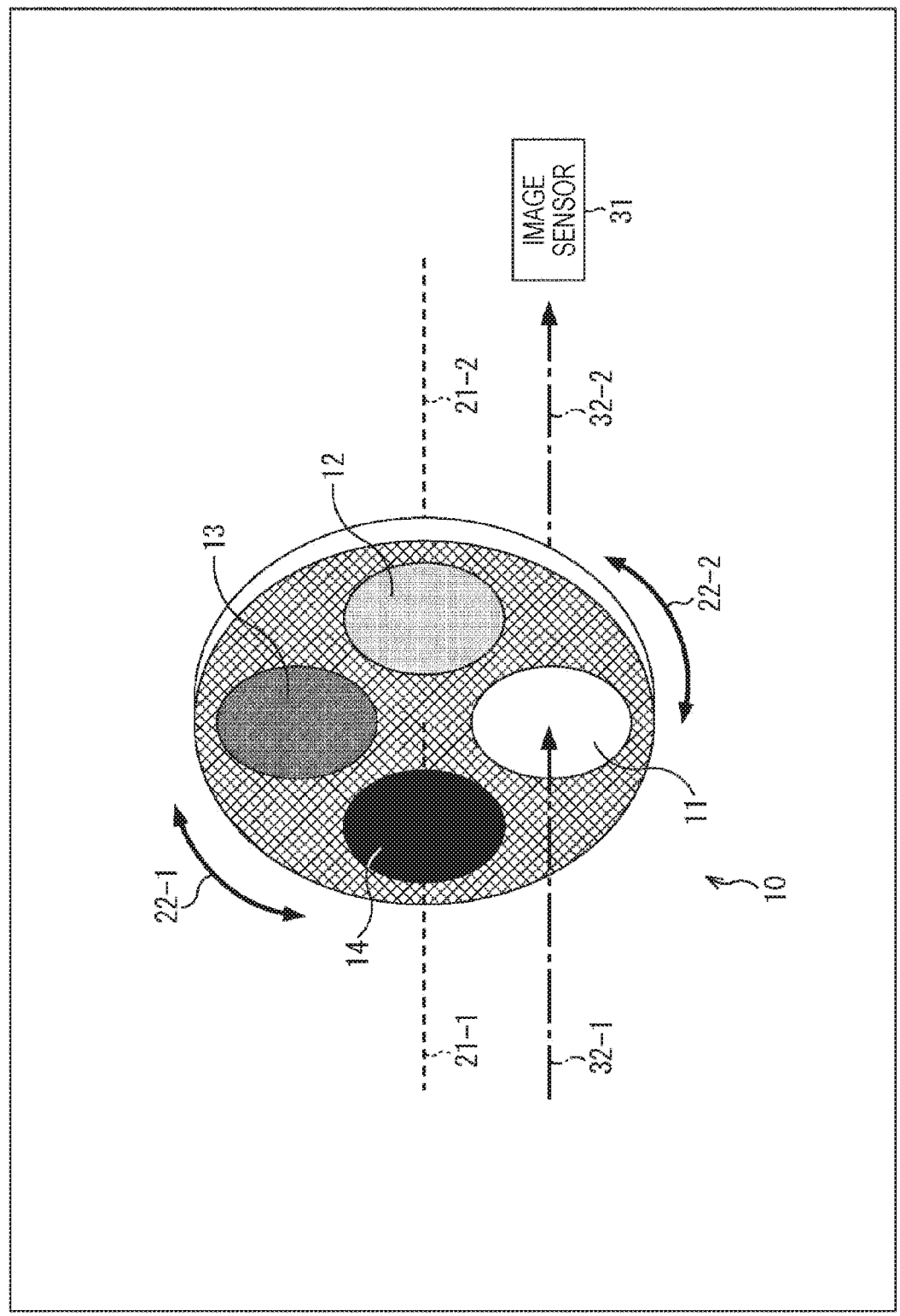
FIG. 1 is a diagram illustrating an example of a conventional turret type ND filter.

Thus, for example, a turret type ND filter with variable transmittance as illustrated in FIG. 1 has been devised. The filter unit illustrated in FIG. 1 includes a circular plate-shaped disk 10 on which ND filters 11 to 14 having different transmittances from each other are disposed. This disk 10 rotates about a straight line (a dotted line 21 (a dotted line 21-1 and a dotted line 21-2)) that passes through a center of a plane of the disk 10 and is perpendicular to the plane, as indicated by a double-headed arrow 22-1 and a double-headed arrow 22-2. This disk 10 is provided in front of (on an incident light side of) an image sensor 31, at a position where an optical axis 32 (an optical axis 32-1 and an optical axis 32-2) of the incident light perpendicularly passes through a predetermined position on a plane. In the case of FIG. 1, the optical axis 32 perpendicularly passes through the ND filter 11.

That is, rotation of the disk 10 is controlled to cause an ND filter (any one of the ND filters 11 to 14) corresponding to a rotational orientation (rotation angle) of the disk 10 to be arranged on the optical axis 32 of the incident light toward the image sensor 31. Then, a luminance of the incident light is adjusted by a transmittance of the ND filter arranged on the optical axis 32.

Figure 2:
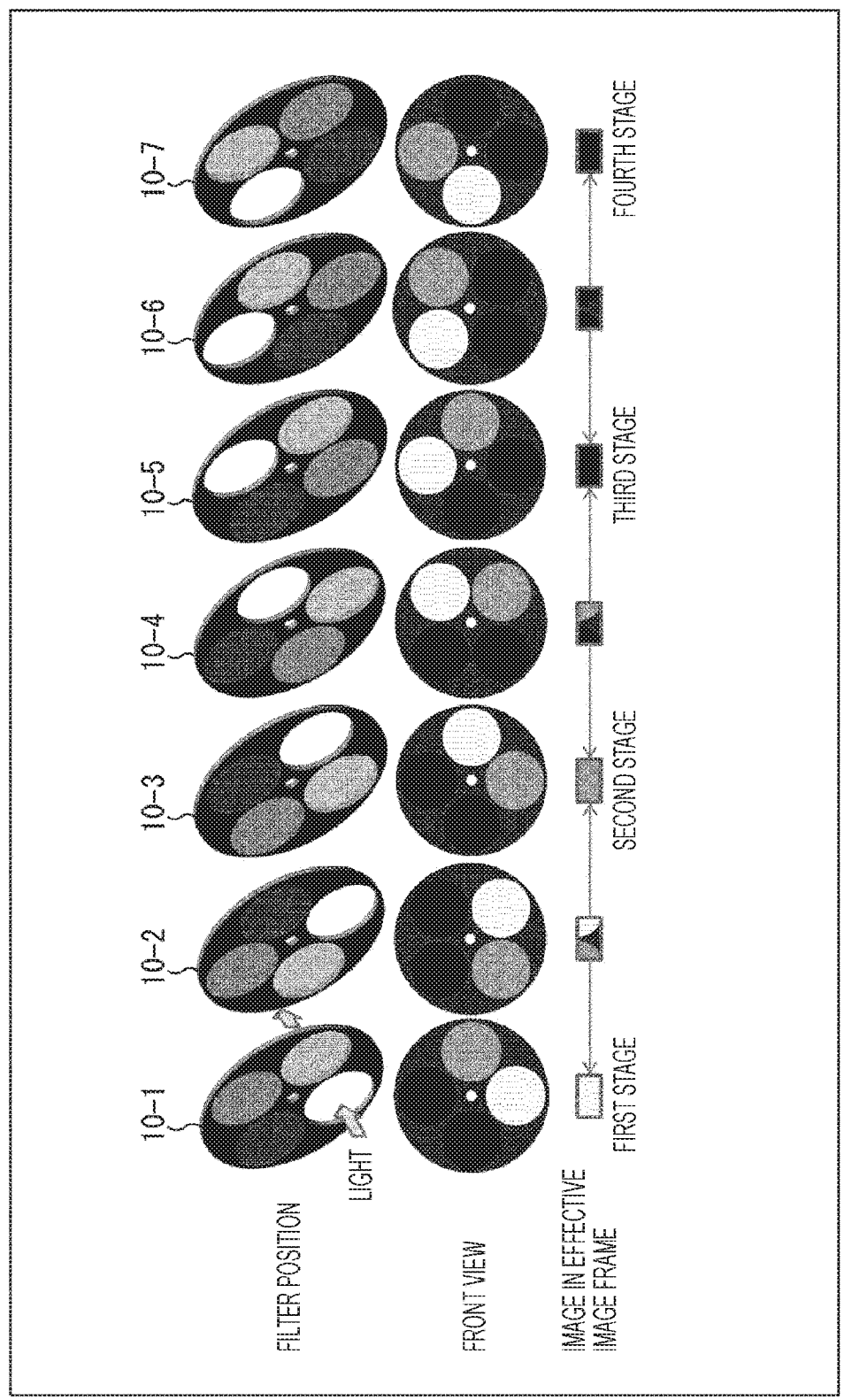
FIG. 2 is a diagram illustrating an example of how the transmittance is switched.

When this disk 10 is rotated as illustrated in an example in FIG. 2 (disks 10-1 to 10-6), positions of the ND filters 11 to 14 move as illustrated in "FRONT VIEW". With this arrangement, the portion in the disk 10 where the incident light passes through changes as illustrated in "IMAGE IN EFFECTIVE IMAGE FRAME". That is, in this case, the transmittance changes in stages (first stage, second stage, third stage, and fourth stage). Moreover, in a period between states in which any one of the ND filters 11 to 14 is arranged on the optical axis 32 (first stage, second stage, third stage, and fourth stage), a black frame (disk 10) between ND filters is unintentionally reflected in an image. In the filter unit including the disk 10 as described above, it has been difficult to continuously change the transmittance.

For example, in a case of an ND filter in which a glass plate is rotated to change a light transmittance in stages as described in Patent Document 1, it is possible to prevent the black frame between ND filters from being reflected in an image. However, also in this case, it has been difficult to change the transmittance continuously.

As an ND filter (continuously variable ND filter) capable of continuously changing the transmittance, for example, a liquid crystal ND filter and a gradation ND filter have been put into practical use.

The liquid crystal ND filter controls the orientation of liquid crystal molecules inside by using voltage to be applied, thereby changing the transmittance. This liquid crystal ND filter having no mechanical element facilitates miniaturization of a device, but it has been difficult to achieve a uniform transmittance. Furthermore, there has been a possibility that transmission spectral characteristics change due to temperature. Moreover, there has been a possibility that polarization distortion occurs.

The gradation ND filter uses an ND filter having a transmittance that gradationally changes, and often uses a combination of two ND filters having transmittances that change in opposite directions to each other in order to achieve a uniform change in transmittance in a screen. This gradation ND filter does not have a significant change in transmittance due to temperature or the like, but there has been a possibility of an increase in size of a mechanism. Furthermore, it is difficult to achieve a gradational change in transmittance (change in predetermined transmittance) of the ND filter with high accuracy, and there has been a possibility of an increase in manufacturing cost of the ND filter.

Furthermore, as another method of obtaining a continuously variable ND filter, a method in which electrochromic is applied has been devised.

In the method in which electrochromic is applied, the transmittance is changed by applying an electric charge to a chemical substance called an electrochromic substance contained in an ND filter. In the case of this method, since a chemical change is used, a time required for the change in transmittance is, for example, about several tens of seconds, which is longer than the practically acceptable time (instantaneous), and it has been difficult to put such an ND filter into practical use as a camera filter. Furthermore, the ND filter according to this method has a relatively large change in transmission spectral characteristics due to the change in transmittance, and it has been difficult to control the transmittance. Furthermore, the ND filter according to this method has a shorter life than a required product life of a camera filter, and has not been suitable for a camera filter.

Moreover, a conventional ND filter is constituted by a single ND filter, and in a case of switching from the ND filter to another filter, it has been necessary to perform cumbersome works such as manually removing the ND filter and setting the another filter. Consequently, particularly in a case of, for example, switching between filters while capturing an image like a live camera, faster switching between filters is desirable. However, in the case of switching as described above, it has been difficult to sufficiently shorten the time required for the switching.

<Switching Between Continuously Variable Filter and Another Filter>

Thus, a disk provided with a plurality of filters including an ND filter having a continuously variable transmittance is rotated to cause a filter corresponding to a rotational orientation of the disk among the plurality of filters provided on the disk to be arranged, as a filter to be used, on an optical axis of incident light toward an image sensor.

For example, in a filter unit for setting a filter to be used, a disk provided with a plurality of filters including an ND filter having a continuously variable transmittance is provided, and a filter corresponding to a rotational orientation of the disk among the plurality of filters provided on the disk is arranged, as the filter to be used, on an optical axis of incident light toward an image sensor.

This allows a desired filter to be arranged more easily on the optical axis of the incident light toward the image sensor, by means of controlling rotation of the disk. That is, the continuously variable ND filter can be more easily arranged on the optical axis of the incident light toward the image sensor. Consequently, a continuous change in transmittance of the ND filter can be achieved more easily. Furthermore, another filter can be arranged more easily on the optical axis of the incident light toward the image sensor. That is, filters can be switched more easily.

2. First Embodiment

<Filter Unit 1>

Figure 3:
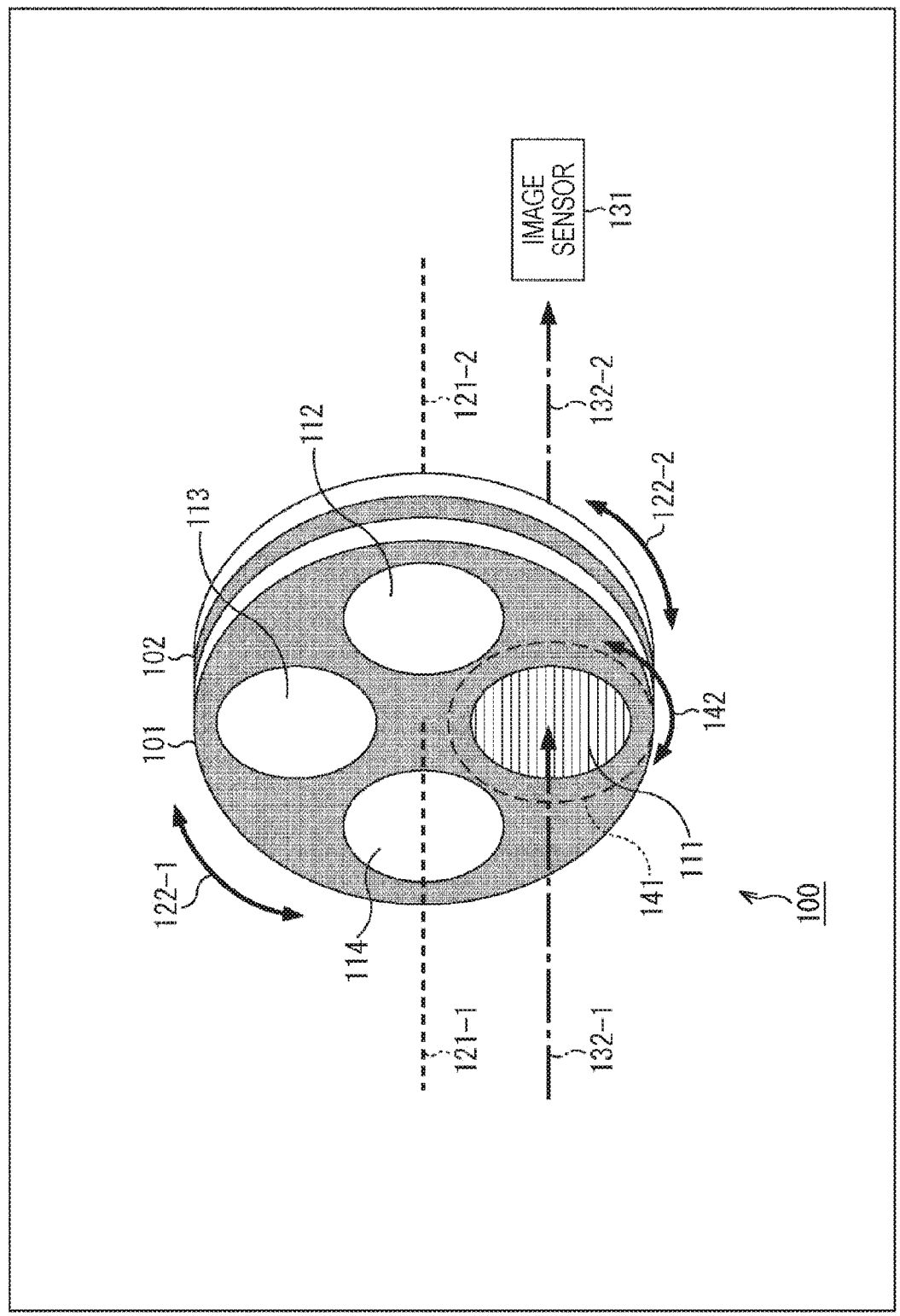
FIG. 3 is a perspective view illustrating a configuration example of a part of a filter unit.

FIG. 3 is a perspective view illustrating an example of a main configuration of an embodiment of a filter unit to which the present technology is applied. A filter unit 100 illustrated in FIG. 3 illustrates a configuration of a part of a unit that causes a desired filter among a plurality of filters including an ND filter having a continuously variable transmittance to be arranged, as a filter to be used, on an optical axis of incident light toward an image sensor. As illustrated in FIG. 3, the filter unit 100 includes a disk 101 and a disk 102.

The disk 101, which is a circular plate-shaped object, rotates about a straight line (dot line 121 (a dotted line 121-1 and a dotted line 121-2)) that passes through a center of a plane of the disk 101 and is perpendicular to the plane (a dotted line 121, as indicated by a double-headed arrow 122-1).

A polarization filter 111 and filters 112 to 114 are disposed on the disk 101. The polarization filter 111 and the filters 112 to 114 have substantially the same shape (for example, a circular shape) with each other, and are arranged evenly spaced out in a rotation direction of the disk 101, each allowing light directed from one plane to the other plane of the disk 101 to pass through.

This disk 101 is provided in front of (on an incident light side of) an image sensor 131, at a position where an optical axis 132 (an optical axis 132-1 and an optical axis 132-2) of the incident light perpendicularly passes through a predetermined position on the plane. At this predetermined position, a rotational orientation (that is, a rotation angle) of the disk 101 is controlled so that any one of the polarization filter 111 or the filters 112 to 114 (a filter corresponding to the rotational orientation of the disk 101) can be arranged on the optical axis 132. That is, the filter unit 100 can control the rotational orientation of the disk 101 to cause a filter that optically affects incident light toward the image sensor 131 (that is, a filter to be used) to be selected. For example, in a case of FIG. 3, the polarization filter 111 is arranged on the optical axis 132. That is, in this case, the polarization filter 111 is being used.

The polarization filter 111 is a polarizer (filter) that converts light passing therethrough into linearly polarized light in a predetermined direction. The polarization filter 111 absorbs an electric field in a direction perpendicular to a predetermined direction of light passing therethrough and allows an electric field in the predetermined direction to pass through, thereby generating linearly polarized light in the predetermined direction. The polarization filter 111 is formed such that a movable portion 141, which includes a periphery of the polarization filter 111 and is a part of the disk 101, is rotatable about a direction that passes through a center of the polarization filter 111 and is perpendicular to the plane of the disk 101. That is, the polarization filter 111 (the movable portion 141) is rotatable in a direction indicated by a double-headed arrow 142.

As the polarization filter 111 (the movable portion 141) is driven to rotate (a rotational orientation of the polarization filter 111 changes), a polarization direction (the predetermined direction described above) of the polarization filter 111 changes. That is, the rotational orientation of the polarization filter 111 (the movable portion 141) can be controlled to control the polarization direction of the polarization filter 111. Note that the rotational driving of the polarization filter 111 (the movable portion 141) can be performed independently from rotational driving of the disk 101.

The filters 112 to 114 are optional filters of different types from each other, other than a polarization filter. For example, the filters may include a through filter that does not optically affect light passing therethrough, a cross filter that adds a four-point star effect to a point light source to emphasize glitter, a bandpass filter that allows light in a predetermined wavelength range to pass through, or any other filter. The filters 112 to 114 may be fixed with respect to the disk 101, or may be movable with respect to the disk 101 like the polarization filter 111. In the description below, it is assumed that the filters 112 to 114 are fixed with respect to the disk 101.

The disk 102 is an object having the same shape as the disk 101, and is disposed parallel to the disk 101. That is, the filter unit 100 includes a plurality of disks arranged in a traveling direction of the incident light. The disk 102 is driven to rotate about the same rotation axis as the disk 101 (that is, about the dotted line 121 (the dotted line 121-1 and the dotted line 121-2)) as indicated by a double-headed arrow 122-2. The rotational driving of the disk 102 can be performed independently from the rotational driving of the disk 101.

Figure 4A:
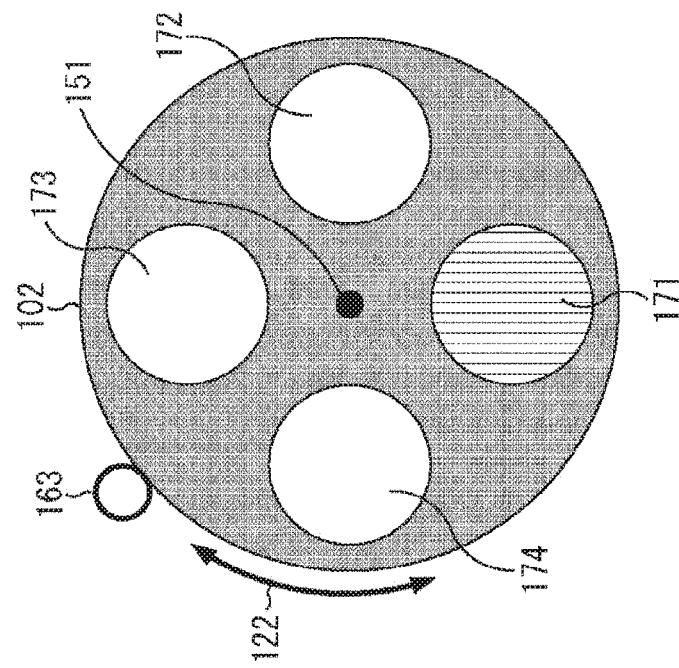
FIGS. 4A and 4B are diagrams illustrating a configuration example of each disk.

FIG. 4A is a plan view of the disk 101 as seen from a side from which the incident light toward the image sensor 131 enters. As illustrated in FIG. 4A, a disk rotation axis 151 passes through the center of the circular plane of the disk 101. The disk 101 is driven to rotate about the disk rotation axis 151 as indicated by a double-headed arrow 122.

A drive unit 161 drives the disk 101 to rotate about the disk rotation axis 151. That is, the drive unit 161 can drive the disk 101 to rotate by an optional angle. In other words, the drive unit 161 can control the rotational orientation of the disk 101. That is, the rotation angle can be controlled.

At that time, the drive unit 161 drives the disk 101 to rotate by applying a force to an outer peripheral portion of the disk 101. As compared with a case where a force is applied to an inner peripheral portion of the disk 101 (for example, the disk rotation axis 151 and the like), in a case where a force is applied to the outer peripheral portion of the disk 101, a speed reduction ratio becomes higher and influence of backlash can be reduced, which enables more accurate angle control.

As a matter of course, the drive unit 161 may apply a force to the inner peripheral portion of the disk 101, such as the disk rotation axis 151. Note that the drive unit 161 may have any specific configuration. For example, the configuration may include a stepping motor, a gear, a belt, or the like.

Furthermore, as described above, the polarization filter 111 (the movable portion 141) is driven to rotate about the center of the polarization filter 111 with respect to the disk 101 as indicated by the double-headed arrow 142.

A drive unit 162 applies a force to the polarization filter 111 (the movable portion 141), thereby driving the polarization filter 111 to rotate. That is, the drive unit 162 can drive the polarization filter 111 (the movable portion 141) to rotate by an optional angle. In other words, the drive unit 162 can control the rotational orientation of the polarization filter 111. That is, the polarization direction of the polarization filter 111 can be controlled.

Furthermore, the drive unit 162 can perform driving independently from the drive unit 161. That is, the drive unit 162 can drive the polarization filter 111 (the movable portion 141) to rotate independently from the rotational driving of the disk 101. Note that the drive unit 162 may have any specific configuration. For example, the configuration may include a stepping motor, a gear, a belt, or the like.

Figure 4B:
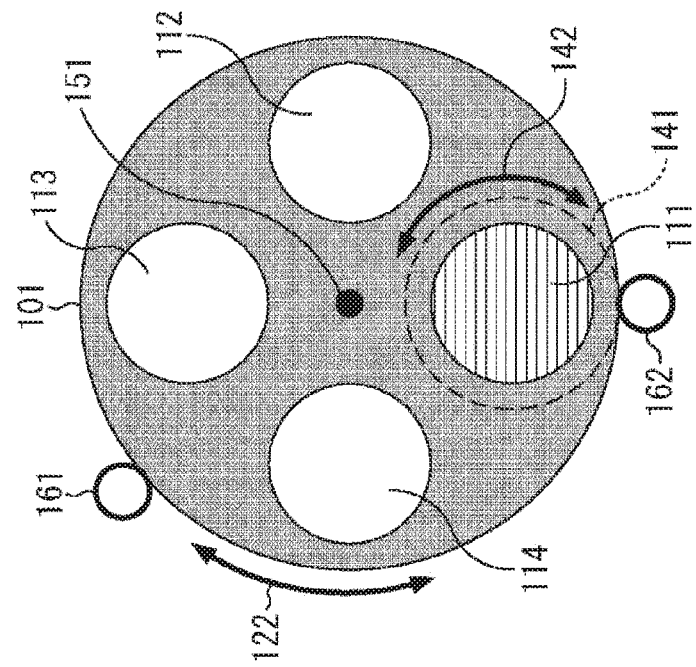

FIG. 4B is a plan view of the disk 102 as seen from a side from which the incident light toward the image sensor 131 enters. As illustrated in FIG. 4B, the disk rotation axis 151 also passes through the center of the circular plane of the disk 102. The disk 102 is driven to rotate about the disk rotation axis 151 as indicated by the double-headed arrow 122.

A drive unit 163 drives the disk 102 to rotate about the disk rotation axis 151. That is, the drive unit 163 can drive the disk 102 to rotate by an optional angle. In other words, the drive unit 163 can control a rotational orientation of the disk 102. That is, the rotation angle can be controlled.

At that time, the drive unit 163 drives the disk 102 to rotate by applying a force to an outer peripheral portion of the disk 102. As compared with a case where a force is applied to an inner peripheral portion of the disk 102 (for example, the disk rotation axis 151 and the like), in a case where a force is applied to the outer peripheral portion of the disk 102, a speed reduction ratio becomes higher and influence of backlash can be reduced, which enables more accurate angle control. As a matter of course, the drive unit 163 may apply a force to the inner peripheral portion of the disk 102, such as the disk rotation axis 151.

Furthermore, the drive unit 163 can perform driving independently from the drive unit 161 or the drive unit 162. That is, the drive unit 163 can rotate the disk 102 independently from rotational driving of the disk 101 or rotational driving of the polarization filter 111 (the movable portion 141). Note that the drive unit 163 may have any specific configuration. For example, the configuration may include a stepping motor, a gear, a belt, or the like.

As illustrated in FIG. 4B, a polarization filter 171 and filters 172 to 174 are disposed on the disk 102. The polarization filter 171 and the filters 172 to 174 have substantially the same shape (for example, a circular shape) with each other, and are arranged evenly spaced out in a rotation direction of the disk 102, each allowing light directed from one plane to the other plane of the disk 102 to pass through.

In a similar manner to the case of the disk 101, the disk 102 is provided at a position in front of (on the incident light side of) the image sensor 131, where the rotational orientation (that is, the rotation angle) of the disk 102 is controlled so that any one of the polarization filter 171 or the filters 172 to 174 (a filter corresponding to the rotational orientation of the disk 102) can be arranged on the optical axis 132 of the incident light toward the image sensor 131. That is, the filter unit 100 can control the rotational orientation of the disk 102 to cause a filter that optically affects the incident light toward the image sensor 131 (that is, a filter to be used) to be selected.

The polarization filter 171 is a polarizer (filter) that converts light passing therethrough into linearly polarized light in a predetermined direction in a similar manner to the polarization filter 111. The polarization filter 171 is disposed so as to be fixed with respect to the disk 102.

For example, a state is assumed in which the drive unit 161 and the drive unit 163 control the rotational orientations of the disk 101 and the disk 102, respectively, so that the polarization filter 111 and the polarization filter 171 are arranged at a position where they optically affect the incident light toward the image sensor 131 (that is, arranged on the optical axis 132 of the incident light as filters to be used). In this state, the incident light toward the image sensor 131 passes through the polarization filter 111 and the polarization filter 171.

In this state, when the drive unit 162 drives the polarization filter (the movable portion 141) to rotate as indicated by the double-headed arrow 142, a relative angle between the polarization direction of the polarization filter 111 and a polarization direction of the polarization filter 171 changes. Due to this change in the relative angle, a transmittance of light passing through the polarization filter 111 and the polarization filter 171 changes.

Figure 5:
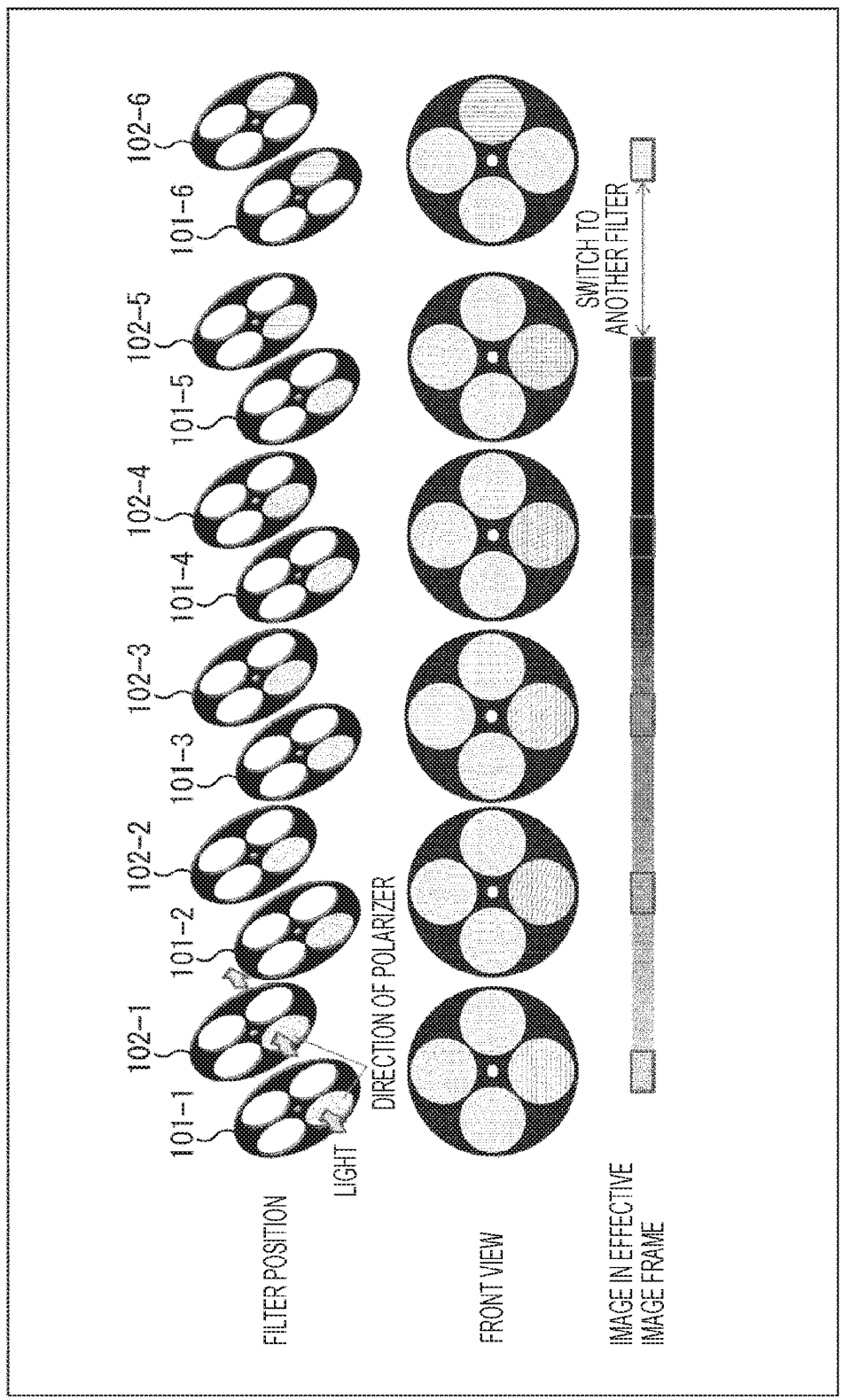
FIG. 5 is a diagram illustrating an example of filter control.

For example, a case is assumed in which the disk 101 and the disk 102 are fixed as indicated by disks 101-1 to 101-5 and disks 102-1 to 102-5 in FIG. 5, and the polarization filter 111 (the movable portion 141) is driven to rotate as indicated by the disks 101-1 to 101-5. In that case, the relative angle between the polarization direction of the polarization filter 111 and the polarization direction of the polarization filter 171 illustrated in stripes changes as illustrated in "FRONT VIEW". With this arrangement, a light transmittance of the polarization filter 111 and the polarization filter 171 changes as illustrated in "IMAGE IN EFFECTIVE IMAGE FRAME".

In the example of FIG. 5, in a state of the disk 101-1, the polarization directions of the polarization filter 111 and the polarization filter 171 are parallel to each other, and the light passing therethrough becomes the brightest (the transmittance is the highest). Furthermore, in a state of the disk 101-5, the polarization directions of the polarization filter 111 and the polarization filter 171 are perpendicular to each other, and the light passing therethrough becomes the darkest (the transmittance is the lowest).

That is, the filter unit 100 serves as an ND filter having a continuously variable transmittance, unlike the ND filter described in Patent Document 1, due to rotational driving of the polarization filter 111 (the movable portion 141). Furthermore, the filter unit 100 can change the transmittance while preventing the black frame between filters from being reflected in an image as in the case of the disk 10 in FIG. 1. That is, the filter unit 100 has an ND filter including the polarization filter 111 and the polarization filter 171 and having a continuously variable transmittance.

In this case, the ND filter is constituted by polarization filters, which makes it possible to easily achieve a uniform transmittance as compared with a liquid crystal ND filter, reduce a change in transmission spectral characteristics due to temperature, and suppress occurrence of polarization distortion.

Furthermore, in this case, the transmittance can be continuously changed only by rotational driving of the polarization filters, and this makes it easier to miniaturize a device than in a case of a gradation ND filter. Furthermore, manufacturing is easy, and an increase in cost can be suppressed.

Moreover, the ND filter in this case can change the transmittance at a higher speed than in the case of the method in which electrochromic is applied, the transmittance can be easily controlled, and its life is longer.

That is, the filter unit 100 can more easily achieve a continuous change in transmittance of the ND filter. Consequently, the filter unit 100 is more suitable for use in a case where, for example, a luminance is adjusted while an image is being captured, as in a so-called live camera.

Note that the polarization filter 171 may be disposed so as to be movable with respect to the disk 102 (disposed so as to enable rotational driving with respect to the disk 102), in a similar manner to the polarization filter 111. In that case, the polarization filter 111 may be disposed so as to be movable with respect to the disk 101 as described above, or may be disposed so as to be fixed with respect to the disk 101.

That is, as described above, the filter unit 100 may include a plurality of disks (for example, the disk 101 and the disk 102), each of which is driven to rotate, independently from each other, about a direction that passes through a center of a plane of the disk and is perpendicular to the plane, a polarization filter provided on at least one of the plurality of disks may be driven to rotate, independently from the rotational driving of the disk, about a direction that passes through a center of the polarization filter and is perpendicular to the plane, and the polarization filter may rotate, on the optical axis of the incident light, about the direction that passes through the center of the polarization filter and is perpendicular to the plane to change a relative angle between polarization directions of the polarization filter and a polarization filter provided on another disk and cause a transmittance of the ND filter to change.

The filters 172 to 174 are optional filters of different types from each other, other than a polarization filter. For example, the filters may include a through filter that does not optically affect light passing through the through filter, a cross filter that adds a four-point star effect to a point light source to emphasize glitter, a bandpass filter that allows light in a predetermined wavelength range to pass through, or any other filter.

The filters 172 to 174 may be constituted by filters of the same types with, or different types from, those of the filters 112 to 114, respectively. That is, the disk 101 and the disk 102 may each include filters of the same types with those of the other disk, or may each include filters of different types from those of the other disk.

In a similar manner to the case of the polarization filter 111 and the polarization filter 171, a filter selected from the filters 112 to 114 and a filter selected from the filters 172 to 174 are used in combination. That is, the incident light toward the image sensor 131 passes through two filters disposed at a position where the filters optically affect the incident light (that is, selected as filters to be used), the two filters being any one of the filters 112 to 114 and any one of the filters 172 to 174. Consequently, it is only required that these two filters be of types that function as a set.

For example, filters of the same type with each other may be selected (disposed at the position where the filters optically affect the incident light), one from each of the disk 101 and the disk 102, as filters to be used. Furthermore, for example, filters of different types from each other that can be used as a set may be selected, one from each of the disk 101 and the disk 102, as filters to be used.

Note that the filters 172 to 174 may be fixed with respect to the disk 102, or may be movable with respect to the disk 102 like the polarization filter 111. In the description below, it is assumed that the filters 172 to 174 are fixed with respect to the disk 102.

For example, the drive unit 161 and the drive unit 163 respectively drive the disk 101 and the disk 102 to rotate to cause the filter unit 100 to switch selected filters to other types of filters (switch the filters arranged at the position where the filters optically affect the incident light toward the image sensor 131 to other types of filters).

For example, when the disk 101 and the disk 102 are driven to rotate from a state of the disk 101-5 and the disk 102-5 to a state of a disk 101-6 and a disk 102-6 illustrated in FIG. 5, the filters arranged at the position where the filters optically affect the incident light toward the image sensor 131 are switched from ND filters (the polarization filter 111 and the polarization filter 171) to other filters. With this arrangement, optical influences other than a luminance adjustment are exerted on the incident light as illustrated in "IMAGE IN EFFECTIVE IMAGE FRAME".

That is, the filter unit 100 can switch between filters by driving the disk 101 and the disk 102 to rotate (controlling the rotational orientations of the disk 101 and the disk 102). That is, the filter unit 100 can switch between filters more easily.

In particular, the disks can be driven to rotate so that other filters can be arranged at the same position, and this makes it possible to switch filters to other filters while suppressing a change in total optical path length of the incident light.

As described above, the filter unit 100 allows continuously changing a transmittance of an ND filter and switching between filters to be performed more easily.

That is, every one of a plurality of disks of the filter unit 100 (for example, the disk 101 and the disk 102) may be driven to rotate about a direction that passes through a center of a plane of the disk and is perpendicular to the plane to cause filters arranged on the optical axis of the incident light to be switched to other filters.

Note that, in the above description, the filter unit 100 includes two disks, the disk 101 and the disk 102, but the filter unit 100 may include any number of disks, such as one disk, or three or more disks. Furthermore, the number of filters formed on each disk is optional, and is not limited to the example of the four filters described above. The number of filters may be three or less, or five or more. Furthermore, each filter may be of any size and shape.

3. Second Embodiment

<Filter Unit 2>

Figure 6:
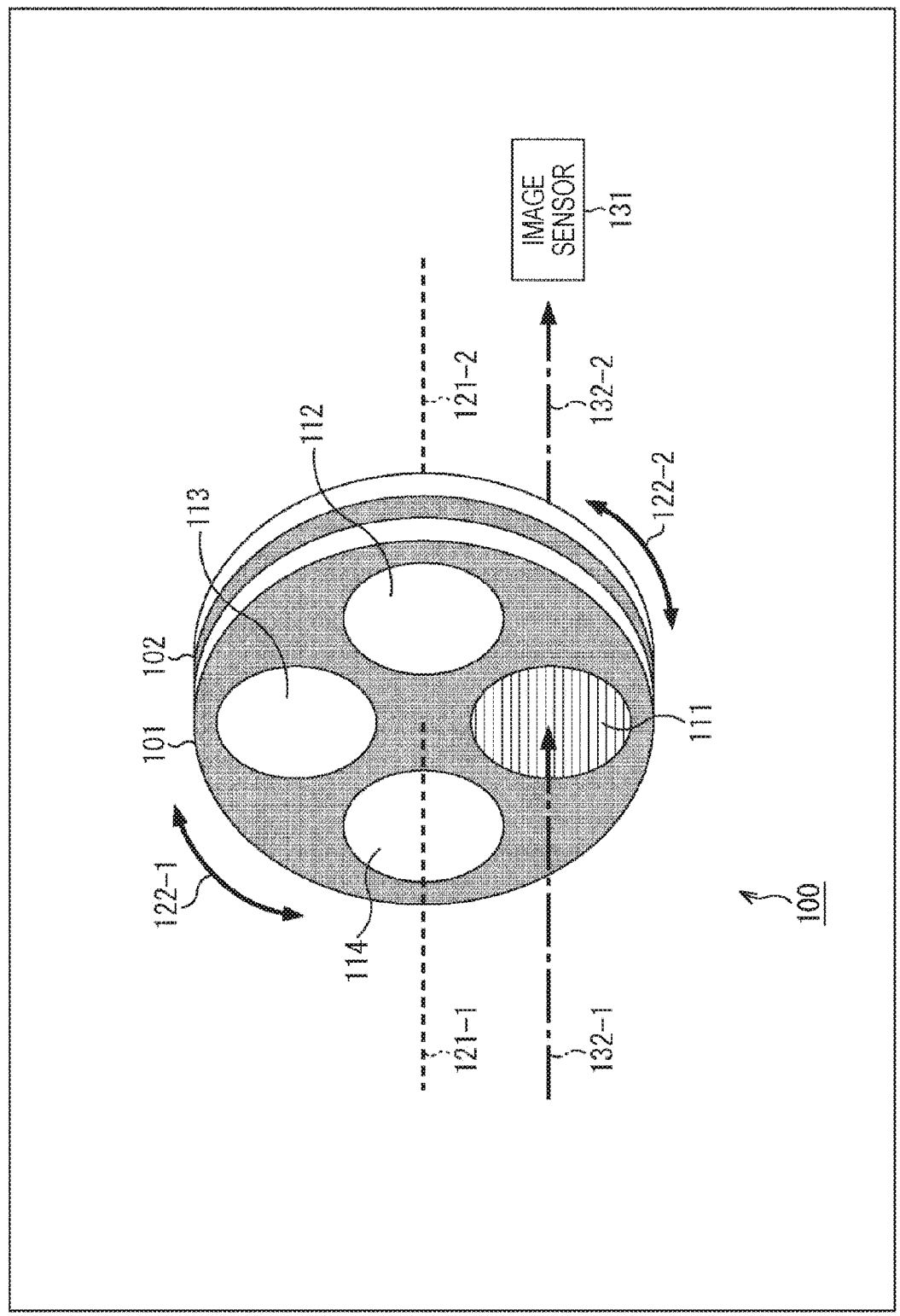
FIG. 6 is a perspective view illustrating a configuration example of a part of a filter unit.

A configuration of a filter unit 100 is not limited to the configuration example described in the first embodiment. FIG. 6 is a perspective view illustrating an example of a main configuration of another embodiment of a filter unit to which the present technology is applied. In the case of FIG. 6, a disk 101 of the filter unit 100 has a polarization filter 111 disposed so as to be fixed with respect to the disk 101.

Figure 7B:
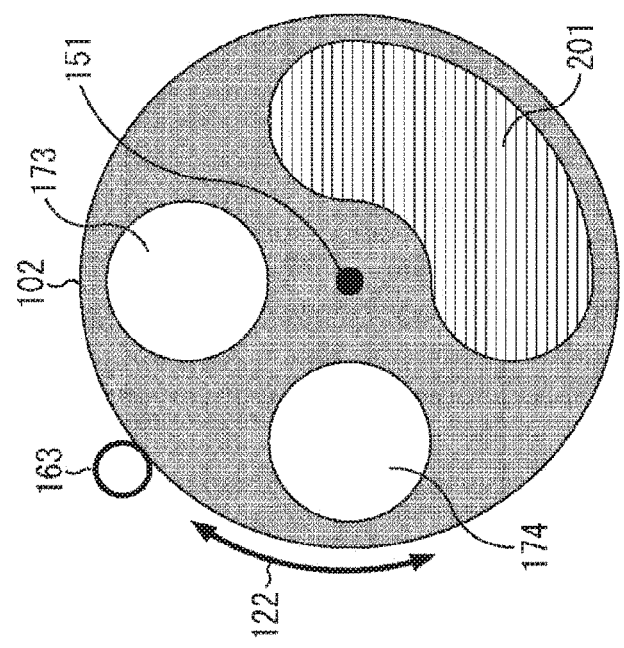
FIGS. 7A and 7B are diagrams illustrating a configuration example of each disk.
Figure 7A:
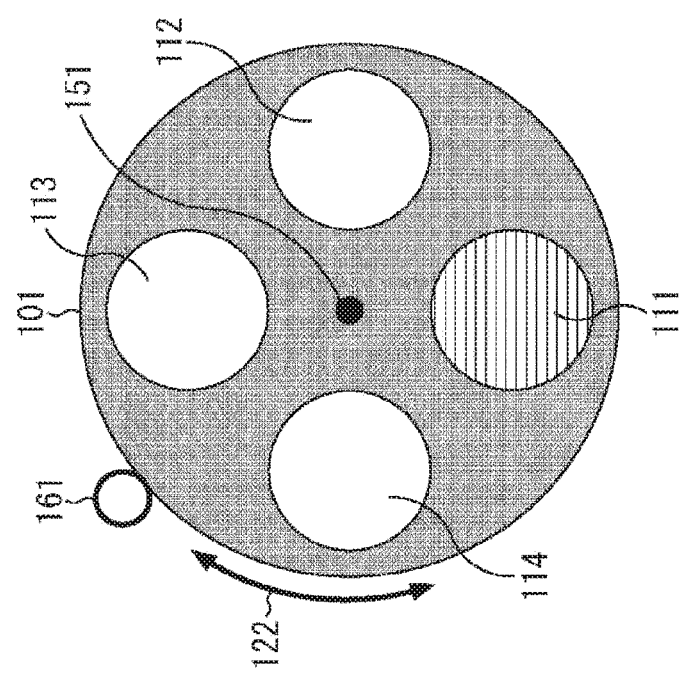

Consequently, as illustrated in FIG. 7A, the disk 101 is not provided with a movable portion 141, and a drive unit 162 for driving the movable portion 141 (the polarization filter 111) to rotate is also omitted. That is, rotational driving about a disk rotation axis 151 as indicated by a double-headed arrow 122 is the only driving applied to the disk 101 in this case.

As illustrated in FIG. 7B, a disk 102 in this case is driven by a drive unit 163 to rotate about the disk rotation axis 151 as indicated by the double-headed arrow 122, in a similar manner to the case of the first embodiment.

However, in this case, the disk 102 has a polarization filter 201 instead of the polarization filter 171 and the filter 172.

The polarization filter 201 is a polarizer (filter) that converts light passing therethrough into linearly polarized light in a predetermined direction in a similar manner to the polarization filter 111 and the polarization filter 171. In a similar manner to the polarization filter 171, the polarization filter 201 is disposed so as to be fixed with respect to the disk 102. However, the polarization filter 201 is different in shape from the polarization filter 111 and the polarization filter 171, and is formed in a non-circular shape whose longitudinal direction is in a rotation direction of the disk 102 (direction of the double-headed arrow 122).

For example, when the disk 102 is driven to rotate with respect to the disk 101, the polarization filter 111 moves along the longitudinal direction of the polarization filter 201. That is, the polarization filter 201 changes its rotational orientation while maintaining a state of being overlapped with the polarization filter 111 by the rotational driving of the disk 102. In other words, the polarization filter 111 moves from one end to the other in the longitudinal direction of the polarization filter 201 while being kept in a state of being overlapped with the polarization filter 201.

Figure 8:
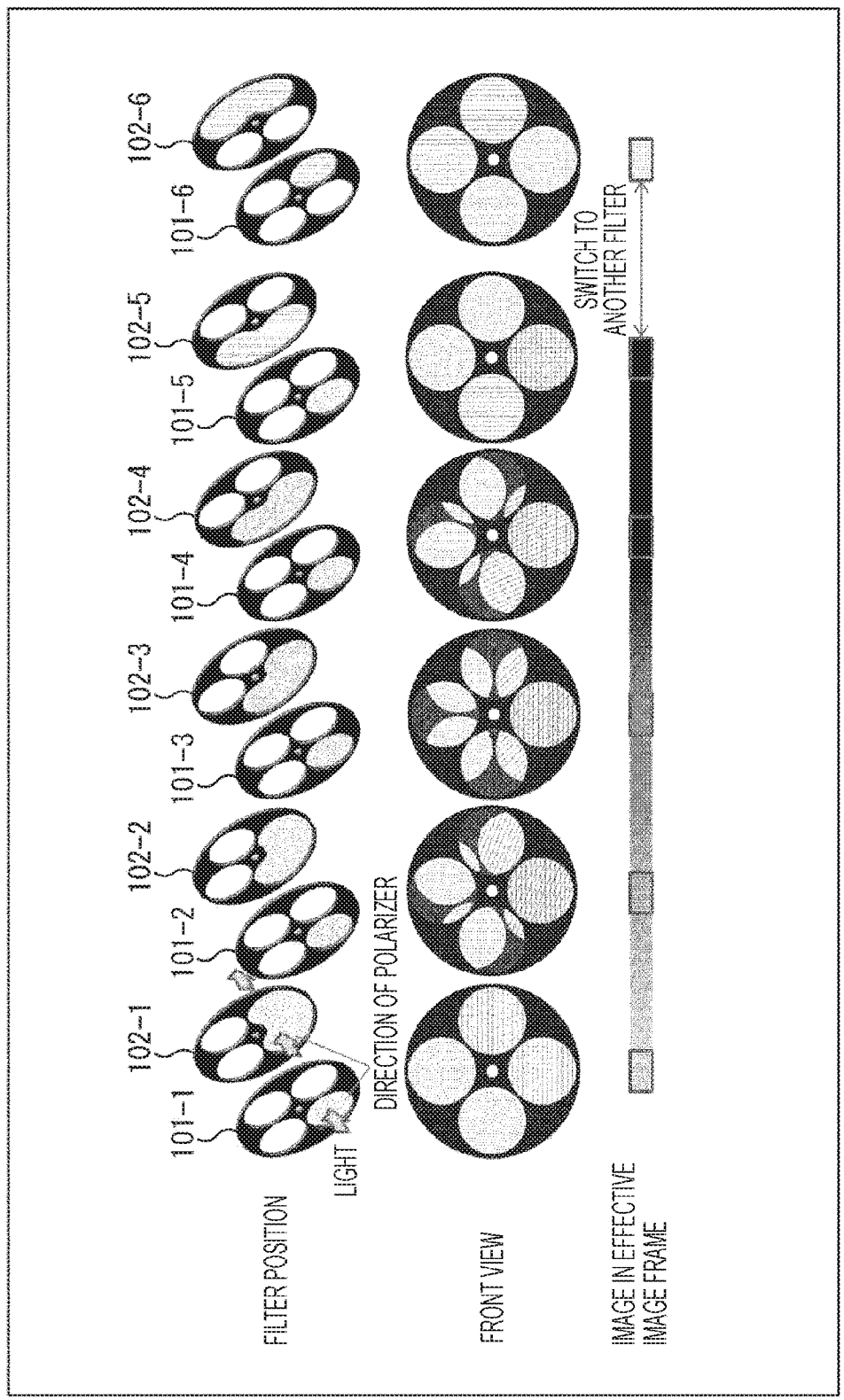
FIG. 8 is a diagram illustrating an example of filter control.

Consequently, for example, as illustrated in FIG. 8, when a relative orientation between the disk 101 and the disk 102 is changed from a state of a disk 101-1 and a disk 102-1 to a state of a disk 101-5 and a disk 102-5 (when the disk 102 is driven to rotate from the state of the disk 102-1 to the state of the disk 102-5 with the disk 101 being fixed), the overlapping of the polarization filter 111 and the polarization filter 201 changes as illustrated in "FRONT VIEW" in FIG. 8. That is, a relative angle between a polarization direction of the polarization filter 111 and a polarization direction of the polarization filter 201 illustrated in stripes changes from a state of being horizontal to each other to a state of being vertical to each other.

With this arrangement, a light transmittance of the polarization filter 111 and the polarization filter 201 changes as illustrated in "IMAGE IN EFFECTIVE IMAGE FRAME". That is, in the state of the disk 102-1, the light passing through the polarization filter 111 and the polarization filter 201 becomes the brightest (the transmittance is the highest). Furthermore, in the state of the disk 102-5, the light passing through the polarization filter 111 and the polarization filter 201 becomes the darkest (the transmittance is the lowest).

That is, in this case, the filter unit 100 serves as an ND filter having a continuously variable transmittance due to rotational driving of the disk 102. That is, the filter unit 100 in this case has an ND filter including the polarization filter 111 and the polarization filter 201 and having a continuously variable transmittance.

That is, also in this case, the filter unit 100 can more easily achieve a continuous change in transmittance of the ND filter. Consequently, the filter unit 100 is more suitable for use in a case where, for example, a luminance is adjusted while an image is being captured, as in a so-called live camera.

That is, as described above, the filter unit 100 may include a plurality of disks (for example, the disk 101 and the disk 102), each of which is driven to rotate, independently from each other, about a direction that passes through a center of a plane of the disk and is perpendicular to the plane, the polarization filter provided on at least one of the plurality of disks may have a non-circular shape whose longitudinal direction is in a rotation direction of the disk, and the polarization filter having the non-circular shape may be driven to rotate, on the optical axis of the incident light, about a direction that passes through a center of a plane of the disk and is perpendicular to the plane to change a relative angle between polarization directions of the polarization filter and a polarization filter provided on another disk and cause a transmittance of the ND filter to change.

In the case of this example, the polarization directions of the polarization filter 111 and the polarization filter 201 are only required to be able to change from a state where the polarization directions are parallel to each other to a state where the polarization directions are perpendicular to each other, and the disk 102 is only required to be able to rotate 90 degrees with respect to the disk 101. That is, the polarization filter 201 in this case is only required to be formed in an area corresponding to a rotation angle of 90 degrees or more of the disk 102. Other types of filters can be formed in the remaining area.

In a similar manner to the case of the first embodiment, also in this case, a drive unit 161 and the drive unit 163 respectively drive the disk 101 and the disk 102 to rotate to cause the filter unit 100 to switch selected filters to other types of filters (switch the filters arranged at a position where the filters optically affect incident light toward an image sensor 131 to other types of filters).

For example, when the disk 101 and the disk 102 are driven to rotate from the state of the disk 101-5 and the disk 102-5 to a state of a disk 101-6 and a disk 102-6 illustrated in FIG. 8, the filters arranged at the position where the filters optically affect the incident light toward the image sensor 131 are switched from ND filters (the polarization filter 111 and the polarization filter 201) to other filters. With this arrangement, optical influences other than a luminance adjustment are exerted on the incident light as illustrated in "IMAGE IN EFFECTIVE IMAGE FRAME".

That is, also in this case, the filter unit 100 can switch between filters by driving the disk 101 and the disk 102 to rotate (controlling rotational orientations of the disk 101 and the disk 102). That is, the filter unit 100 can switch between filters more easily.

As described above, also in this case, the filter unit 100 allows continuously changing a transmittance of an ND filter and switching between filters to be performed more easily, in a similar manner to the case of the first embodiment.

That is, every one of a plurality of disks of the filter unit 100 (for example, the disk 101 and the disk 102) may be driven to rotate about a direction that passes through a center of a plane of the disk and is perpendicular to the plane more largely than in a case of changing a transmittance of the ND filter, to cause filters arranged on the optical axis of the incident light to be switched to other filters.

In this case, both changing of the transmittance of the ND filter and switching between filters to be used can be achieved by rotational driving about the same rotation axis (that is, the disk rotation axis 151). Therefore, a drive mechanism can be simplified as compared with the case of the first embodiment by omitting the drive unit 162, for example.

Note that, also in this case, the filter unit 100 may include any number of disks. Furthermore, any number of filters may be formed on each disk. Furthermore, each filter may be of any size and shape.

Furthermore, in this case, deviation of a center of gravity of the disk 101 or the disk 102 (displacement from the disk rotation axis 151) may occur and cause, for example, the disk 101 or the disk 102 to rotate due to gravity in a state where there is no load, resulting in a reduction in accuracy of angle control. By providing filters other than a polarization filter on portions of the disk 101 or the disk 102 other than the portion where the polarization filter is formed and aligning the center of gravity of the disk 101 or the disk 102 with the disk rotation axis 151 as described above, it is possible to suppress such an influence of gravity and prevent a reduction in accuracy of angle control.

4. Third Embodiment

<Filter Unit 3>

Figure 9:
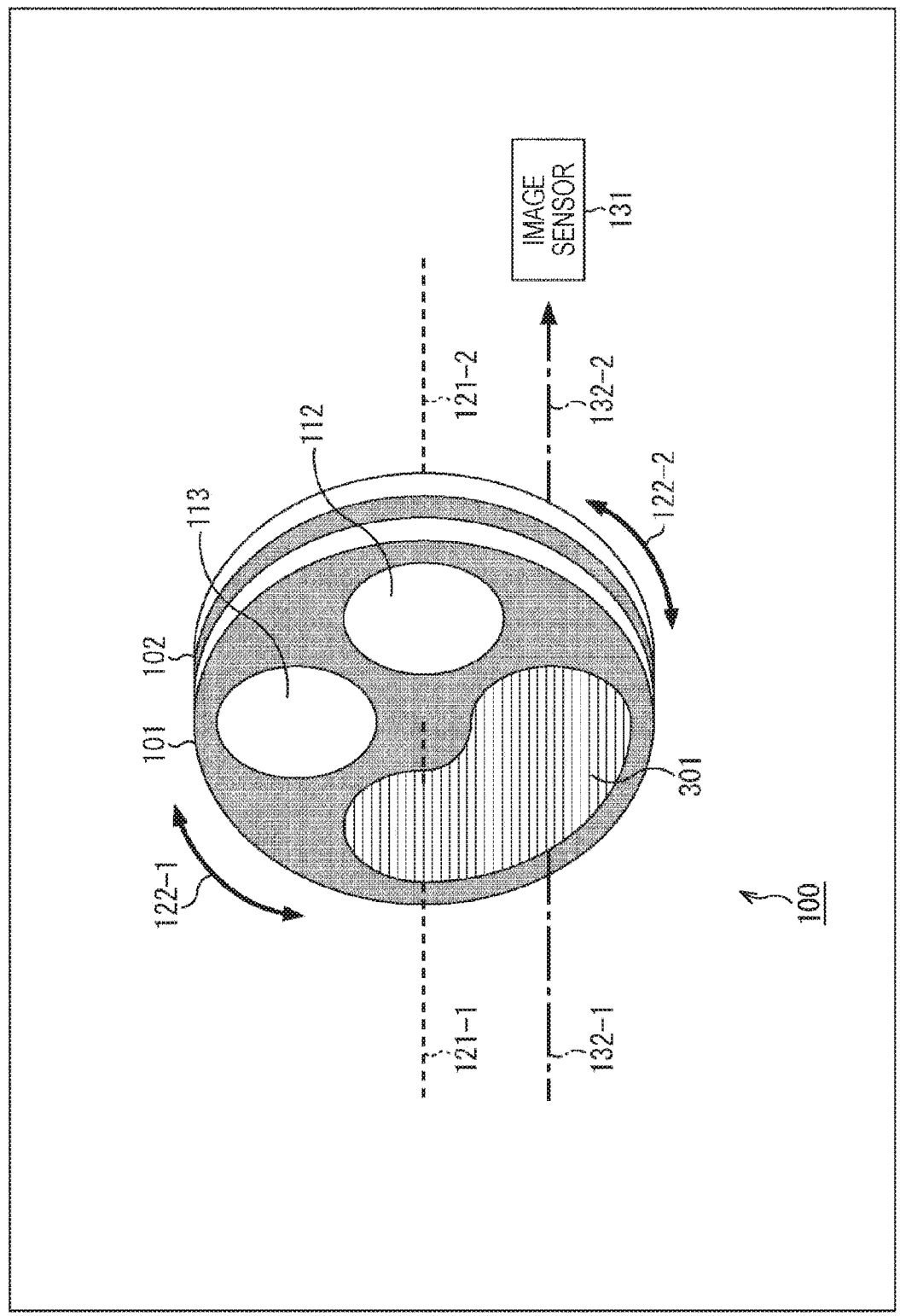
FIG. 9 is a perspective view illustrating a configuration example of a part of a filter unit.

FIG. 9 is a perspective view illustrating an example of a main configuration of still another embodiment of a filter unit to which the present technology is applied. In the case of FIG. 9, a disk 101 of a filter unit 100 has a polarization filter 301 disposed so as to be fixed with respect to the disk 101.

The polarization filter 301 is a polarizer (filter) that converts light passing therethrough into linearly polarized light in a predetermined direction in a similar manner to the polarization filter 111 and the polarization filter 171. As illustrated in FIG. 10A, the polarization filter 301 is formed in a non-circular shape whose longitudinal direction is in a rotation direction of the disk 101 (direction of a double-headed arrow 122) in a similar manner to the polarization filter 201.

Furthermore, as illustrated in FIG. 10A, the disk 101 in this case is not provided with a movable portion 141, and a drive unit 162 for driving the movable portion 141 (the polarization filter 111) to rotate is also omitted. That is, rotational driving about a disk rotation axis 151 as indicated by the double-headed arrow 122 is the only driving applied to the disk 101 in this case.

Figure 10B:
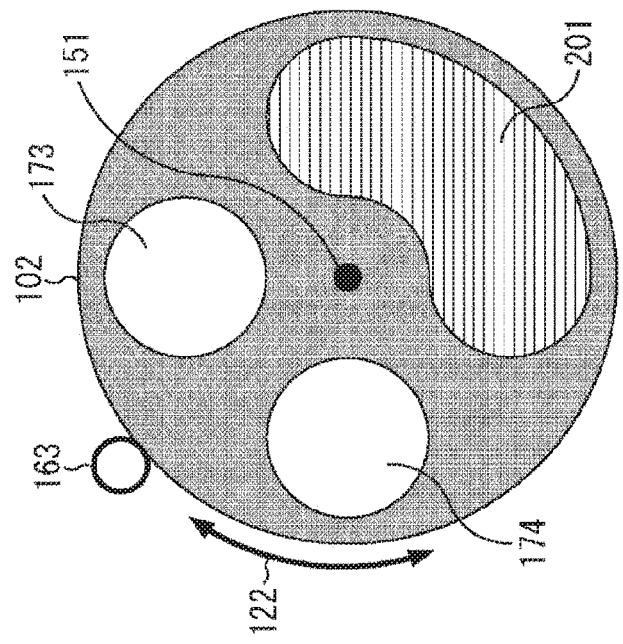
FIGS. 10A and 10B are diagrams illustrating a configuration example of each disk.
Figure 10A:
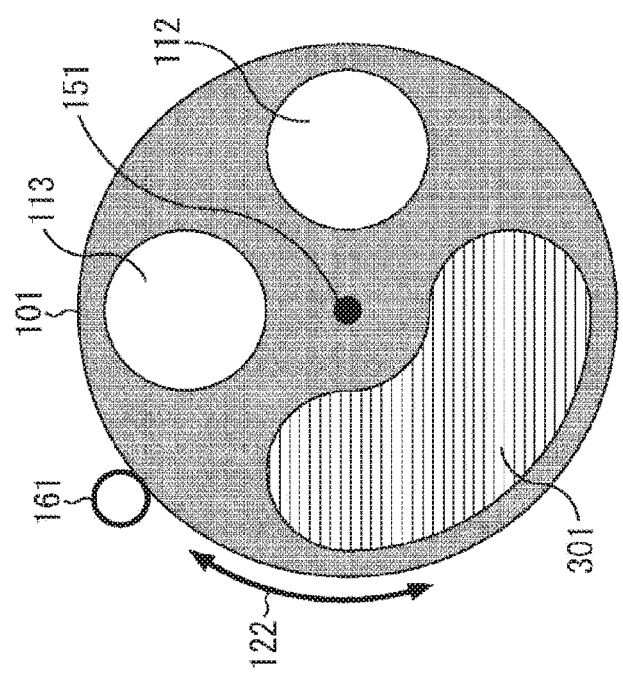

As illustrated in FIG. 10B, a configuration and a state of rotational driving of a disk 102 in this case are similar to those in the case of the second embodiment.

In the case of the third embodiment, both the disk 101 and the disk 102 are driven to rotate in opposite directions to each other to control a relative angle between polarization directions of the polarization filter 301 and the polarization filter 201.

When the disk 101 and the disk 102 are driven to rotate in opposite directions to each other, the polarization filter 301 and the polarization filter 201 move along each other's longitudinal direction. That is, the polarization filter 301 and the polarization filter 201 change their rotational orientations while maintaining a state of being overlapped with each other by the rotational driving of the disk 101 and the disk 102 in opposite directions to each other.

Figure 11:
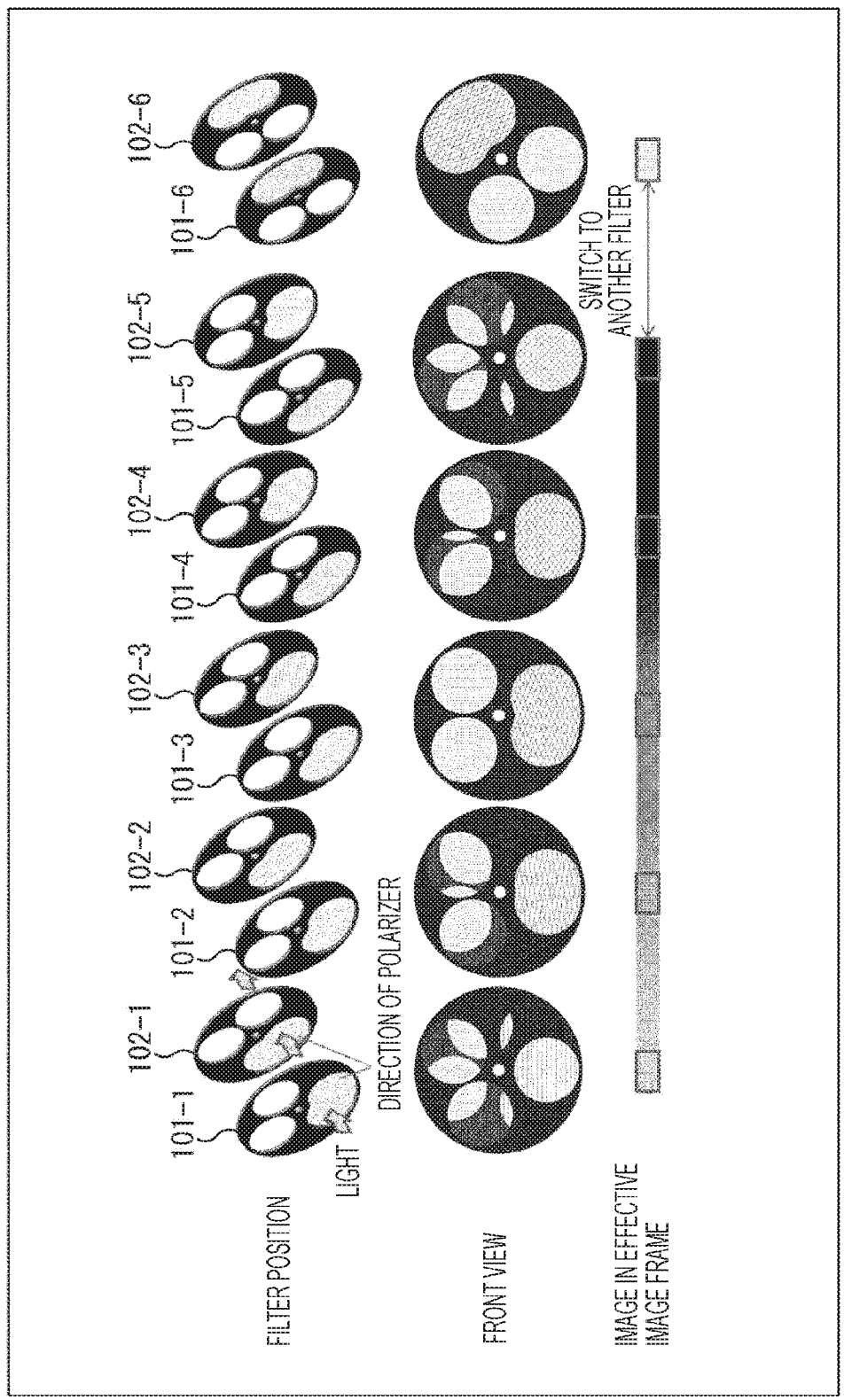
FIG. 11 is a diagram illustrating an example of filter control.

Consequently, for example, as illustrated in FIG. 11, when a relative orientation between the disk 101 and the disk 102 is changed from a state of a disk 101-1 and a disk 102-1 to a state of a disk 101-5 and a disk 102-5 (when the disk 102 is driven to rotate from the state of the disk 102-1 to the state of the disk 102-5 while the disk 101 is driven to rotate from the state of the disk 101-1 to the state of the disk 101-5), the overlapping of the polarization filter 301 and the polarization filter 201 changes as illustrated in "FRONT VIEW" in FIG. 11. That is, the relative angle between the polarization direction of the polarization filter 301 and the polarization direction of the polarization filter 201 illustrated in stripes changes from a state of being horizontal to each other to a state of being vertical to each other.

With this arrangement, a light transmittance of the polarization filter 301 and the polarization filter 201 changes as illustrated in "IMAGE IN EFFECTIVE IMAGE FRAME". That is, in the state of the disk 101-1 and the disk 102-1, the light passing through the polarization filter 301 and the polarization filter 201 becomes the brightest (the transmittance is the highest). Furthermore, in the state of the disk 101-5 and the disk 102-5, the light passing through the polarization filter 301 and the polarization filter 201 becomes the darkest (the transmittance is the lowest).

That is, in this case, the filter unit 100 serves as an ND filter having a continuously variable transmittance due to rotational driving of the disk 101 and the disk 102 in opposite directions to each other. That is, the filter unit 100 in this case has an ND filter including the polarization filter 301 and the polarization filter 201 and having a continuously variable transmittance.

That is, also in this case, the filter unit 100 can more easily achieve a continuous change in transmittance of the ND filter. Consequently, the filter unit 100 is more suitable for use in a case where, for example, a luminance is adjusted while an image is being captured, as in a so-called live camera.

That is, as described above, the filter unit 100 may include a plurality of disks (for example, the disk 101 and the disk 102), each of which is driven to rotate, independently from each other, about a direction that passes through a center of a plane of the disk and is perpendicular to the plane, a polarization filter provided on every one of the plurality of disks may have a non-circular shape whose longitudinal direction is in a rotation direction of the disk, and the polarization filters having the non-circular shape may each be driven to rotate, on the optical axis of the incident light, about a direction that passes through a center of a plane of the disk and is perpendicular to the plane to change a relative angle between polarization directions of the polarization filters and cause a transmittance of the ND filter to change.

In the case of this example, the polarization directions of the polarization filter 301 and the polarization filter 201 are only required to be able to change from a state where the polarization directions are parallel to each other to a state where the polarization directions are perpendicular to each other, and the relative angle between the disk 101 and the disk 102 is only required to be able to change by 90 degrees. That is, the polarization filter 301 in this case is only required to be formed in an area corresponding to a rotation angle of 45 degrees or more of the disk 101. In a similar manner, the polarization filter 201 is only required to be formed in an area corresponding to a rotation angle of 45 degrees or more of the disk 102. Other types of filters can be formed in the remaining area of each of the disk 101 and the disk 102.

Furthermore, in a similar manner to the cases of the first embodiment and the second embodiment, also in this case, a drive unit 161 and a drive unit 163 respectively drive the disk 101 and the disk 102 to rotate to cause the filter unit 100 to switch selected filters to other types of filters (switch the filters arranged at a position where the filters optically affect incident light toward an image sensor 131 to other types of filters).

For example, when the disk 101 and the disk 102 are driven to rotate from the state of the disk 101-5 and the disk 102-5 to a state of a disk 101-6 and a disk 102-6 illustrated in FIG. 11, the filters arranged at the position where the filters optically affect the incident light toward the image sensor 131 are switched from ND filters (the polarization filter 301 and the polarization filter 201) to other filters. With this arrangement, optical influences other than a luminance adjustment are exerted on the incident light as illustrated in "IMAGE IN EFFECTIVE IMAGE FRAME".

That is, also in this case, the filter unit 100 can switch between filters by driving the disk 101 and the disk 102 to rotate (controlling rotational orientations of the disk 101 and the disk 102). That is, the filter unit 100 can switch between filters more easily.

As described above, also in this case, the filter unit 100 allows continuously changing a transmittance of an ND filter and switching between filters to be performed more easily, in a similar manner to the cases of the first embodiment and the second embodiment.

That is, every one of a plurality of disks of the filter unit 100 (for example, the disk 101 and the disk 102) may be driven to rotate about a direction that passes through a center of a plane of the disk and is perpendicular to the plane more largely than in a case of changing a transmittance of the ND filter, to cause filters arranged on the optical axis of the incident light to be switched to other filters.

In this case, both changing of the transmittance of the ND filter and switching between filters to be used can be achieved by rotational driving about the same rotation axis (that is, the disk rotation axis 151). Therefore, a drive mechanism can be simplified as compared with the case of the first embodiment by omitting the drive unit 162, for example.

Note that, also in this case, the filter unit 100 may include any number of disks. Furthermore, any number of filters may be formed on each disk. Furthermore, each filter may be of any size and shape.

Furthermore, in this case, deviation of a center of gravity of the disk 101 or the disk 102 (displacement from the disk rotation axis 151) may occur and cause, for example, the disk 101 or the disk 102 to rotate due to gravity in a state where there is no load, resulting in a reduction in accuracy of angle control. By providing filters other than a polarization filter on portions of the disk 101 or the disk 102 other than the portion where the polarization filter is formed and aligning the center of gravity of the disk 101 or the disk 102 with the disk rotation axis 151 as described above, it is possible to suppress such an influence of gravity and prevent a reduction in accuracy of angle control.

5. Fourth Embodiment

<Application Example of Filter Unit>

Next, an application example of the above-described filter unit 100 will be described. The filter unit 100 described in the first to third embodiments and the like can be used in, for example, an imaging device that captures an image of a subject.

That is, a disk provided with a plurality of filters including an ND filter having a continuously variable transmittance may be rotated to cause a filter corresponding to a rotational orientation of the disk among the plurality of filters provided on the disk to be arranged at a predetermined position, and incident light from a subject incident through the arranged filter may be photoelectrically converted to generate a captured image.

For example, an imaging device may include an imaging unit that captures an image of a subject, and a filter unit having a disk provided with a plurality of filters including an ND filter having a continuously variable transmittance, in which a filter corresponding to a rotational orientation of the disk among the plurality of filters provided on the disk is arranged on an optical axis of incident light toward the imaging unit.

This allows the imaging device to perform continuously changing a transmittance of an ND filter and switching between filters more easily.

<Arrangement example>

In a case where the filter unit 100 is used in the imaging device as described above, the filter unit 100 may be arranged at any position. For example, as illustrated in FIG. 12A, a polarization filter may be arranged in front of a lens (on a subject side). However, in this case, incident light contains ultraviolet rays, which may accelerate deterioration of the filter unit 100. Furthermore, light rays having a large angle with respect to an incident surface also pass through, and this may cause shading to occur easily.

Furthermore, for example, as illustrated in FIG. 12B, the filter unit 100 may be provided inside the imaging device (camera). More specifically, the filter unit 100 (polarization filter) may be provided between the imaging unit and an ultraviolet cut filter that blocks ultraviolet components contained in the incident light.

This allows light incident on the filter unit 100 (polarization filter) to become substantially parallel light, and this suppresses occurrence of shading that depends on an incidence angle. Furthermore, with such an arrangement, light from a subject is incident on the filter unit 100 (polarization filter) through the lens and the ultraviolet cut filter (UV cut filter). This allows ultraviolet components of light passing through the filter unit 100 to be significantly reduced, and allows deterioration of the filter unit 100 due to ultraviolet rays to be prevented.

<Example of Main Configuration of Imaging Device>

Figure 13:
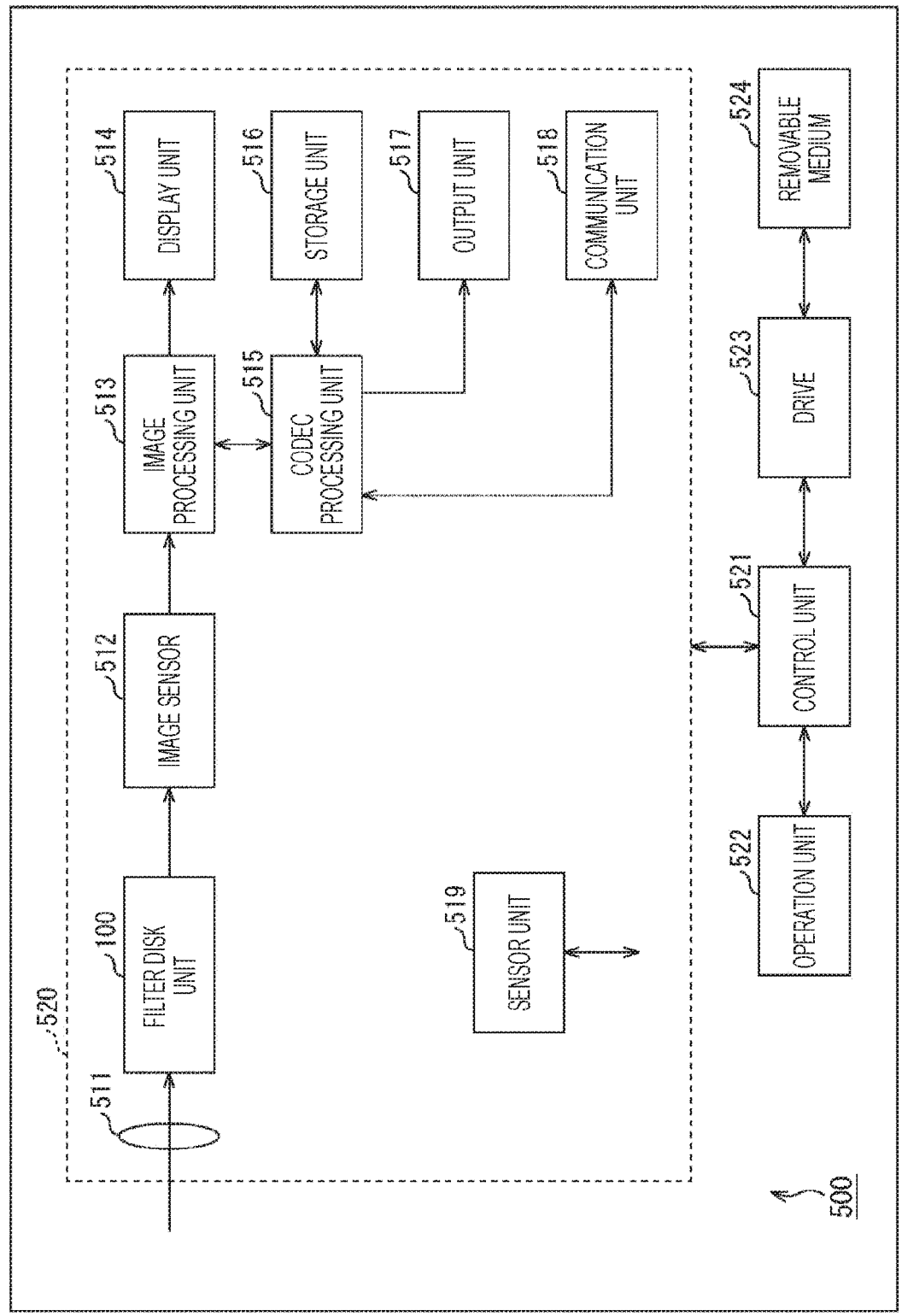
FIG. 13 is a block diagram illustrating an example of a main configuration of an imaging device.

FIG. 13 is a block diagram illustrating an example of a main configuration of an imaging device as an example of electronic equipment to which the present technology is applied. An imaging device 500 illustrated in FIG. 13 is a device that captures an image of a subject and outputs an image of the subject as an electric signal.

As illustrated in FIG. 13, the imaging device 500 includes an optical unit 511, the filter unit 100, a complementary metal oxide semiconductor (CMOS) image sensor 512, an image processing unit 513, a display unit 514, a codec processing unit 515, a storage unit 516, an output unit 517, a communication unit 518, a sensor unit 519, a control unit 521, an operation unit 522, and a drive 523.

The optical unit 511 includes a lens for adjusting a focus to the subject and collecting light from a focused position, a diaphragm for adjusting exposure, a shutter for controlling a timing of image capturing, the ultraviolet cut filter, and the like. The optical unit 511 allows light (incident light) from the subject to pass through and supplies the light to the CMOS image sensor 512 via the filter unit 100.

The CMOS image sensor 512 photoelectrically converts the incident light, performs analog-to-digital conversion on a signal for each pixel (pixel signal), performs signal processing such as correlated double sampling (also referred to as CDS), and supplies captured image data that has undergone the signal processing to the image processing unit 513.

The image processing unit 513 performs image processing on the captured image data obtained by the CMOS image sensor 512. More specifically, the image processing unit 513 performs, on the captured image data supplied from the CMOS image sensor 512, various types of image processing such as color mixture correction, black level correction, white balance adjustment, demosaic processing, matrix processing, gamma correction, and YC conversion. The image processing unit 513 supplies the captured image data that has undergone the image processing to the display unit 514.

The display unit 514 is configured as, for example, a liquid crystal display or the like, and displays an image (for example, an image of a subject) of the captured image data supplied from the image processing unit 513.

The image processing unit 513 further supplies the captured image data that has undergone the image processing to the codec processing unit 515, as necessary.

The codec processing unit 515 performs, on the captured image data supplied from the image processing unit 513, encoding processing of a predetermined method, and supplies the obtained coded data to the storage unit 516. Furthermore, the codec processing unit 515 reads coded data recorded in the storage unit 516, decodes the coded data to generate decoded image data, and supplies the decoded image data to the image processing unit 513.

The image processing unit 513 performs predetermined image processing on the decoded image data supplied from the codec processing unit 515. The image processing unit 513 supplies the decoded image data that has undergone the image processing to the display unit 514. The display unit 514 is configured as, for example, a liquid crystal display or the like, and displays an image of the decoded image data supplied from the image processing unit 513.

Furthermore, the codec processing unit 515 may supply the output unit 517 with coded data obtained by encoding captured image data supplied from the image processing unit 513, or coded data of captured image data read from the storage unit 516, and cause the data to be output to the outside of the imaging device 500. Furthermore, the codec processing unit 515 may supply the output unit 517 with captured image data before being encoded or decoded image data obtained by decoding coded data read from the storage unit 516, and cause the data to be output to the outside of the imaging device 500.

Moreover, the codec processing unit 515 may cause captured image data, coded data of captured image data, or decoded image data to be transmitted to another device via the communication unit 518. Furthermore, the codec processing unit 515 may acquire captured image data or coded data of image data via the communication unit 518. The codec processing unit 515 performs, as appropriate, encoding, decoding, or the like on captured image data or coded data of image data acquired via the communication unit 518. The codec processing unit 515 may be configured to supply obtained image data or coded data to the image processing unit 513 as described above, or output such data to the storage unit 516, the output unit 517, and the communication unit 518.

The storage unit 516 stores coded data and the like supplied from the codec processing unit 515. The coded data stored in the storage unit 516 is read and decoded by the codec processing unit 515 as necessary. Captured image data obtained by the decoding processing is supplied to the display unit 514, and a captured image corresponding to the captured image data is displayed.

The output unit 517 has an external output interface such as an external output terminal, and outputs various types of data supplied via the codec processing unit 515 to the outside of the imaging device 500 via the external output interface.

The communication unit 518 supplies various types of information such as image data and coded data supplied from the codec processing unit 515 to another device that is a communications partner of predetermined communication (wired communication or wireless communication). Furthermore, the communication unit 518 acquires various types of information such as image data and coded data from another device that is a communications partner of predetermined communication (wired communication or wireless communication), and supplies the information to the codec processing unit 515.

The sensor unit 519 measures (observes) conditions of the outside of the imaging device 500. The sensor unit 519 has an optional sensor such as an optical sensor, an acceleration sensor, a voice sensor, or a temperature sensor, and can detect optional information.

The control unit 521 controls operations of the processing units (the processing units illustrated inside a dotted frame 520, the operation unit 522, and the drive 523) of the imaging device 500.

The operation unit 522 is constituted by, for example, an optional input device such as a jog dial (trademark), a key, a button, or a touch panel, accepts an operation input from, for example, a user and the like, and supplies a signal corresponding to the operation input to the control unit 521.

The drive 523 reads information stored in a removable medium 524 such as a magnetic disk, an optical disk, a magneto-optical disk, or a semiconductor memory inserted into the drive 523. The drive 523 reads various types of information such as programs and data from the removable medium 524, and supplies the information to the control unit 521. Furthermore, in a case where the removable medium 524 is writable and inserted into the drive 523, the drive 523 can cause the removable medium 524 to store various types of information such as image data and coded data supplied via the control unit 521.

Furthermore, the filter unit 100 is the filter unit 100 described in the first to third embodiments and the like, and the configurations described in any of these embodiments can also be applied.

That is, in the filter unit 100, a filter through which incident light toward the CMOS image sensor 512 passes can be set. For example, the filter unit 100 can continuously change a transmittance of an ND filter constituted by a plurality of polarization filters. Furthermore, for example, the filter unit 100 can switch the filter through which the incident light toward the CMOS image sensor 512 passes to another filter. That is, the filter unit 100 allows continuously changing a transmittance of an ND filter and switching between filters to be performed more easily.

<Configuration of filter unit>

Switching of filters and changing of the transmittance of the ND filter by the filter unit 100 can be electrically controlled. The electric control enables a remote operation, a minute control, an automatic exposure correction function, a depth of field control function linked with an iris, and the like. Furthermore, the electric control can be linked with camera image quality correction, and this allows hue correction to be performed in accordance with light intensity adjustment.

Figure 14:
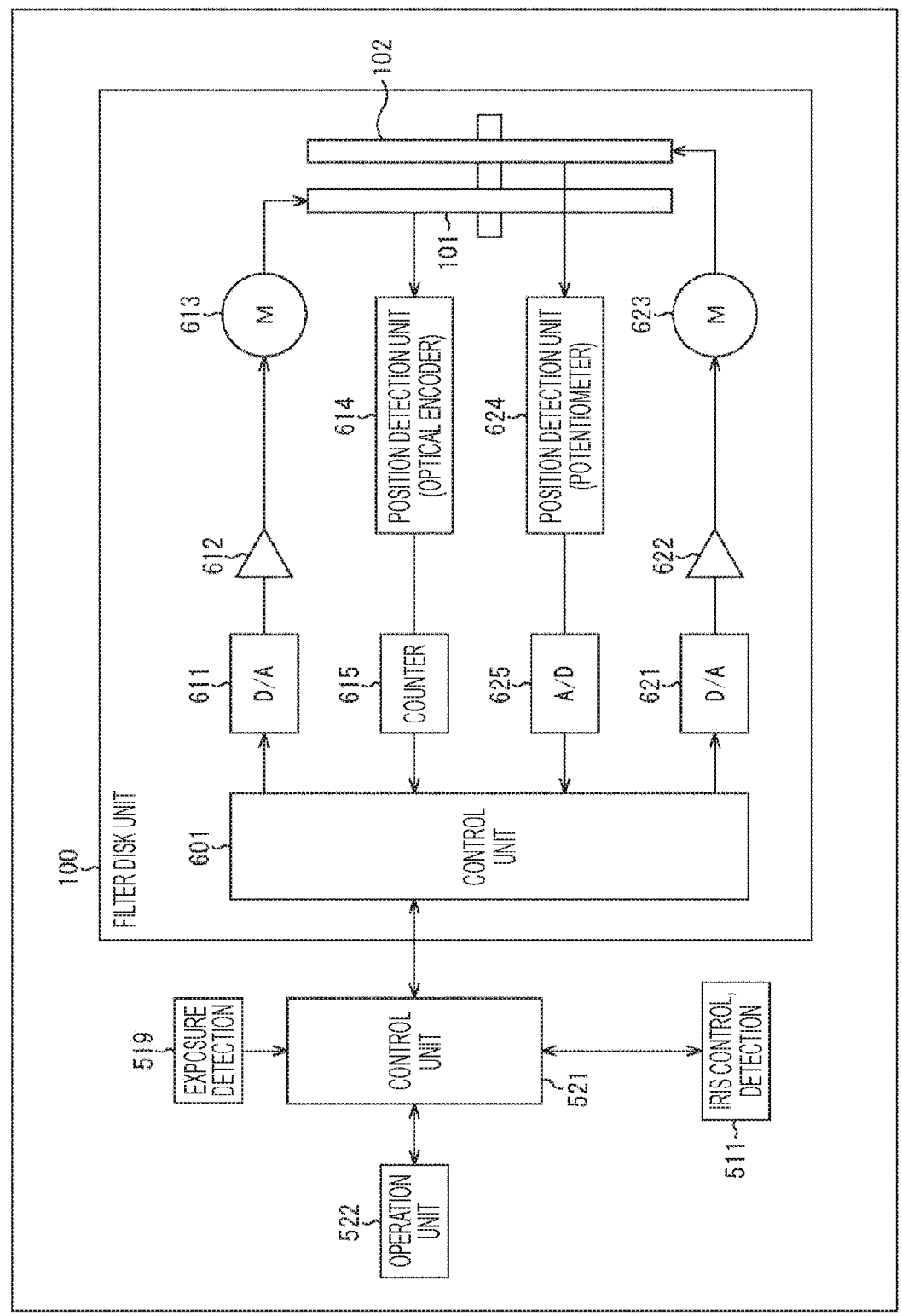
FIG. 14 is a block diagram illustrating an example of a main configuration of the filter unit.

FIG. 14 is a block diagram illustrating an example of a main configuration of the filter unit 100. As illustrated in FIG. 14, the filter unit 100 includes, in addition to a disk 101 and a disk 102, a control unit 601, a digital-to-analog conversion unit 611, an amplification unit 612, a motor 613, a position detection unit 614, a counter 615, a digital-to-analog conversion unit 621, an amplification unit 622, a motor 623, a position detection unit 624, and an analog-to-digital conversion unit 625.

The disk 101 and the disk 102 can have, for example, a configuration described in any one of the first to third embodiments.

The control unit 601 is controlled by the control unit 521, and controls the processing units (the disk 101 and the disk 102, the digital-to-analog conversion unit 611 to the analog-to-digital conversion unit 625, and the like) of the filter unit 100. For example, the control unit 601 controls rotational driving of the disk 101 and the disk 102 via the motor 613 and the motor 623 to achieve desired rotational orientations of the disk 101 and the disk 102.

For example, the control unit 601 supplies the digital-to-analog conversion unit 611 with a control signal for controlling the rotational orientation of the disk 101. Furthermore, the control unit 601 acquires, from the counter 615, a count value obtained on the basis of the control signal. The control unit 601 grasps the current rotational orientation of the disk 101 on the basis of the count value. The control unit 601 supplies a new control signal to the digital-to-analog conversion unit 611 in accordance with the grasped orientation. That is, the control unit 601 controls the rotational orientation of the disk 101 as described above.

In a similar manner, the control unit 601 supplies the digital-to-analog conversion unit 621 with a control signal for controlling the rotational orientation of the disk 102. Furthermore, the control unit 601 acquires, from the analog-to-digital conversion unit 625, a position detection signal obtained on the basis of the control signal. The control unit 601 grasps the current rotational orientation of the disk 102 on the basis of a value of the detection signal. The control unit 601 supplies a new control signal to the digital-to-analog conversion unit 621 in accordance with the grasped orientation. That is, the control unit 601 controls the rotational orientation of the disk 102 as described above.

The digital-to-analog conversion unit 611 converts the control signal, which is a digital signal, supplied from the control unit 601 into an analog signal, and supplies the analog control signal to the amplification unit 612. The amplification unit 612 amplifies the control signal supplied from the digital-to-analog conversion unit 611, and supplies the amplified control signal to the motor 613.

The motor 613 is an example of the drive unit 161 described above, and drives the disk 101 to rotate about its center in accordance with the control signal supplied from the amplification unit 612.

The position detection unit 614 detects the rotational orientation of the disk 101. For example, the position detection unit 614 detects a position in a rotation direction, an amount of rotation, a rotation angle, or the like. For example, the position detection unit 614 includes an optical encoder. The optical encoder is a sensor that irradiates the disk 101 with predetermined light and detects a predetermined pattern (for example, a barcode and the like) formed on the disk 101.

For example, patterns are formed on the disk 101 at a predetermined angular interval, and the optical encoder of the position detection unit 614 irradiates the disk 101 with light in a predetermined direction and detects all patterns passing through the detection position. The optical encoder outputs a detection result as a pulse wave. That is, the position detection unit 614 supplies the counter 615 with the pulse wave corresponding to the number of detected patterns. Note that the optical encoder may be of a reflective type that detects light reflected from the disk 101, or of a transmission type that detects light that has passed through the disk 101.

The counter 615 counts the number of pulses contained in a signal (pulse wave) supplied from the position detection unit 614, that is, the number of detected patterns. The counter 615 supplies a signal indicating its count value to the control unit 601.

On the basis of this count value, that is, the number of detected patterns, the rotational orientation (rotation angle) of the disk 101 can be obtained.

The control unit 601 feeds back a detection result obtained by the position detection unit 614 as described above. On the basis of the detection result, rotational driving of the disk 101 is controlled via the motor 613 to achieve a desired rotational orientation of the disk 101. Consequently, the control unit 601 can control the rotational orientation of the disk 101 with higher accuracy.

The digital-to-analog conversion unit 621 converts the control signal, which is a digital signal, supplied from the control unit 601 into an analog signal, and supplies the analog control signal to the amplification unit 622. The amplification unit 622 amplifies the control signal supplied from the digital-to-analog conversion unit 621, and supplies the amplified control signal to the motor 623.

The motor 623 is an example of the drive unit 163 described above, and drives the disk 102 to rotate about its center in accordance with the control signal supplied from the amplification unit 622.

The position detection unit 624 detects the rotational orientation of the disk 102. For example, the position detection unit 624 detects a position in a rotation direction, an amount of rotation, a rotation angle, or the like. For example, the position detection unit 624 includes a potentiometer. The potentiometer is an element that converts a rotation angle of the disk 102 into a voltage. The position detection unit 624 uses this potentiometer to generate an analog signal of the voltage corresponding to the rotation angle of the disk 102, and supplies the analog signal to the analog-to-digital conversion unit 625.

The analog-to-digital conversion unit 625 converts the analog signal supplied from the position detection unit 624 into a digital signal, and supplies the digital signal to the control unit 601.

On the basis of the level of this signal, the rotational orientation (rotation angle) of the disk 102 can be obtained.

The control unit 601 feeds back a detection result obtained by the position detection unit 624 as described above. On the basis of the detection result, rotational driving of the disk 102 is controlled via the motor 623 to achieve a desired rotational orientation of the disk 102. Consequently, the control unit 601 can control the rotational orientation of the disk 102 with higher accuracy.

Note that, the disk 101 and the disk 102 can be configured as in the example described in the first embodiment by providing a drive system corresponding to the drive unit 162, in addition to the drive system including the digital-to-analog conversion unit 611 to the counter 615 and the drive system including the digital-to-analog conversion unit 621 to the analog-to-digital conversion unit 625 described above. This drive system can also have a configuration basically similar to those of the drive systems described above.

Figure 15:
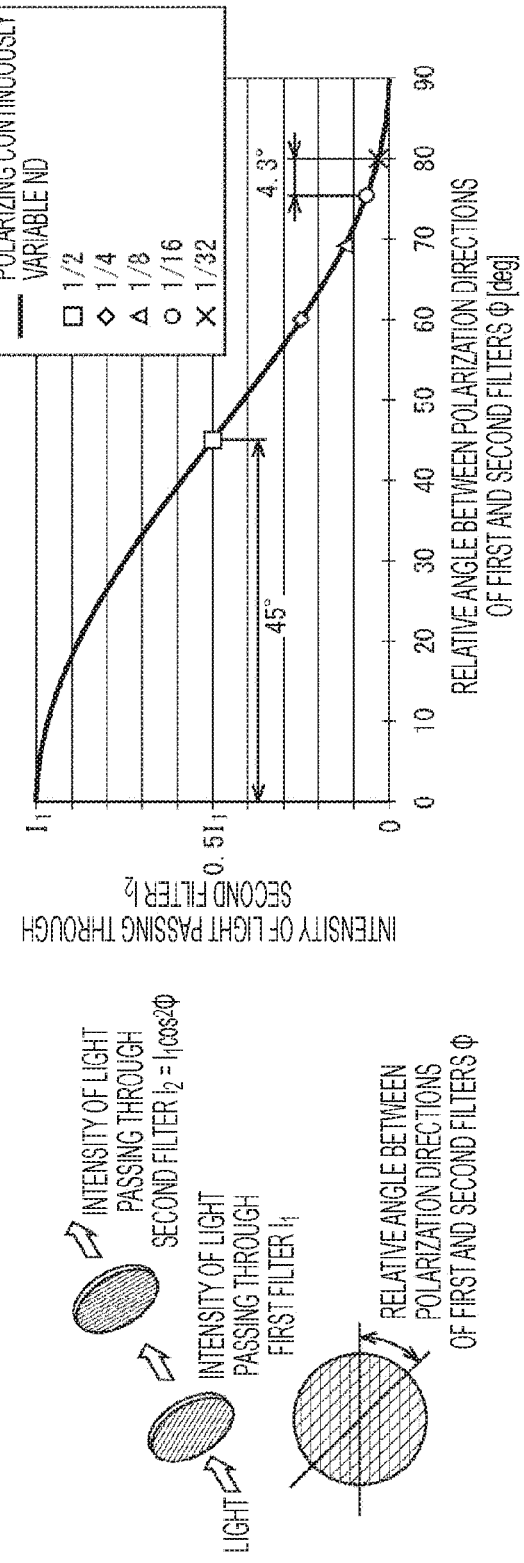
FIG. 15 is a diagram illustrating characteristics of a relative angle between polarization directions.

As described above in the first to third embodiments, the ND filter of the filter unit 100 is constituted by a plurality of polarization filters. Such an ND filter has, due to characteristics of polarization, a relationship between a light intensity and a relative angle between polarization directions of two filters (characteristics of a relative angle between polarization directions) as illustrated in FIG. 15, for example. For example, in a case of adjusting the amount of light to decrease by half, $\Delta\varphi=45°$ is required to decrease the light intensity MAX ($\varphi=0°$) by half, but $\Delta\varphi$=about 4.3° is required to decrease the light intensity $I_2=\frac{1}{16}$ by half, that is, $\frac{1}{32}$. That is, in a range where the light intensity is low, the light intensity changes largely with a minute change in angle, and thus a minute angle control is required.

The filter unit 100 electrically controls the rotational orientation of each disk as described above. Moreover, the filter unit 100 uses a detection result that has been fed back to control the rotational orientation of each disk as described above. Consequently, the filter unit 100 can control the rotational orientation of each disk with higher accuracy.

Note that, in the above description, the position detection unit 614 uses the optical encoder to detect the rotation angle of the disk 101, and the position detection unit 624 uses the potentiometer to detect the rotation angle of the disk 102, but the method of detecting the rotation angle of each disk is optional and is not limited to these examples.

For example, a rotary sensor (variable resistance), a magnetic encoder that detects a pattern by a magnetic change, or the like may be used. Rotary sensors are relatively inexpensive, and optical encoders and magnetic encoders enable detection with high accuracy.

<Flow of Filter Control Processing 1>

Figure 16:
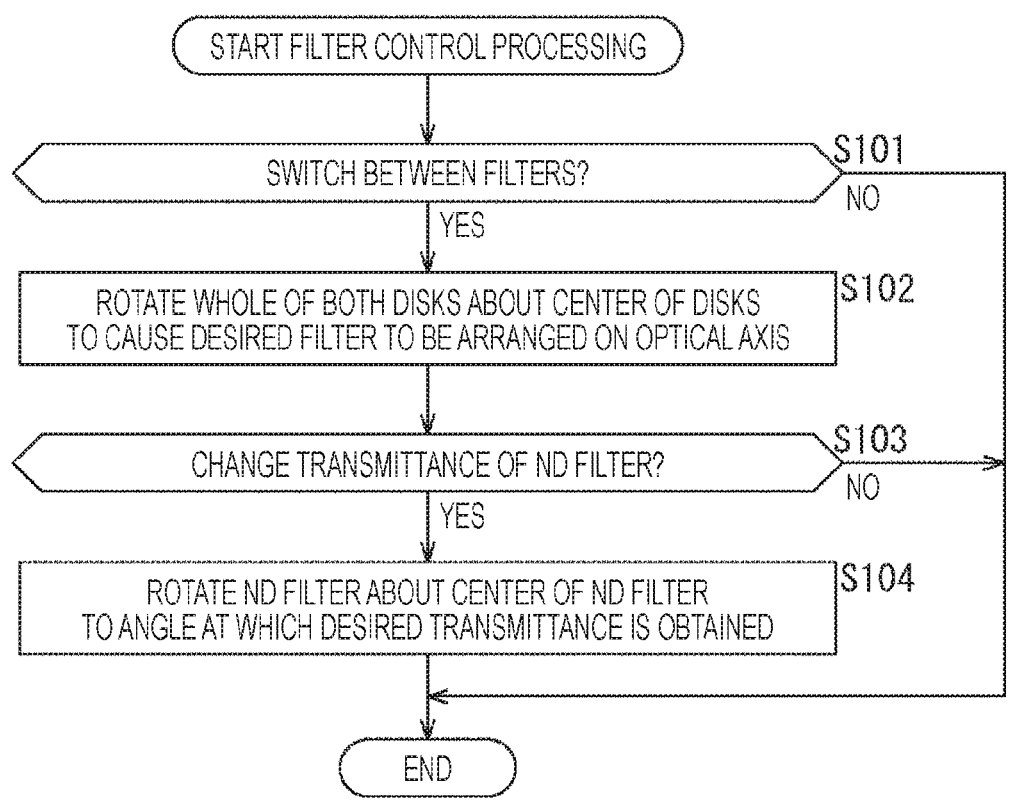
FIG. 16 is a flowchart illustrating an example of a flow of filter control processing.

Next, an example of a flow of filter control processing executed by the filter unit 100 in a case where the filter unit 100 having the configuration described in the first embodiment is used will be described with reference to a flowchart in FIG. 16.

When the filter control processing is started, the control unit 601 determines in step S101 whether or not to switch between filters. For example, in a case where it is determined that switching between filters should be performed on the basis of an instruction from a user or the like, the processing proceeds to step S102.

In step S102, the control unit 601 rotates the disk 101 and the disk 102 about the center of the disks (a disk rotation axis 151) to cause a desired filter to be arranged on the optical axis.

In step S103, the control unit 601 determines whether or not to change the transmittance of the ND filter. In a case where it is determined that the transmittance should be changed, the processing proceeds to step S104.

In step S104, the control unit 601 rotates a polarization filter 111 (a movable portion 141) about a center of the ND filter (that is, the polarization filter 111) to an angle at which the ND filter has a desired transmittance. When the processing of step S104 ends, the filter control processing ends.

Furthermore, in a case where it is determined in step S101 that switching between filters should not be performed, the filter control processing ends. Furthermore, in a case where it is determined in step S103 that the transmittance of the ND filter should not be changed, the filter control processing ends.

The filter control processing as described above causes the filter unit 100 having the configuration described in the first embodiment to allow continuously changing a transmittance of an ND filter and switching between filters to be performed more easily.

<Flow of Filter Control Processing 2>

Figure 17:
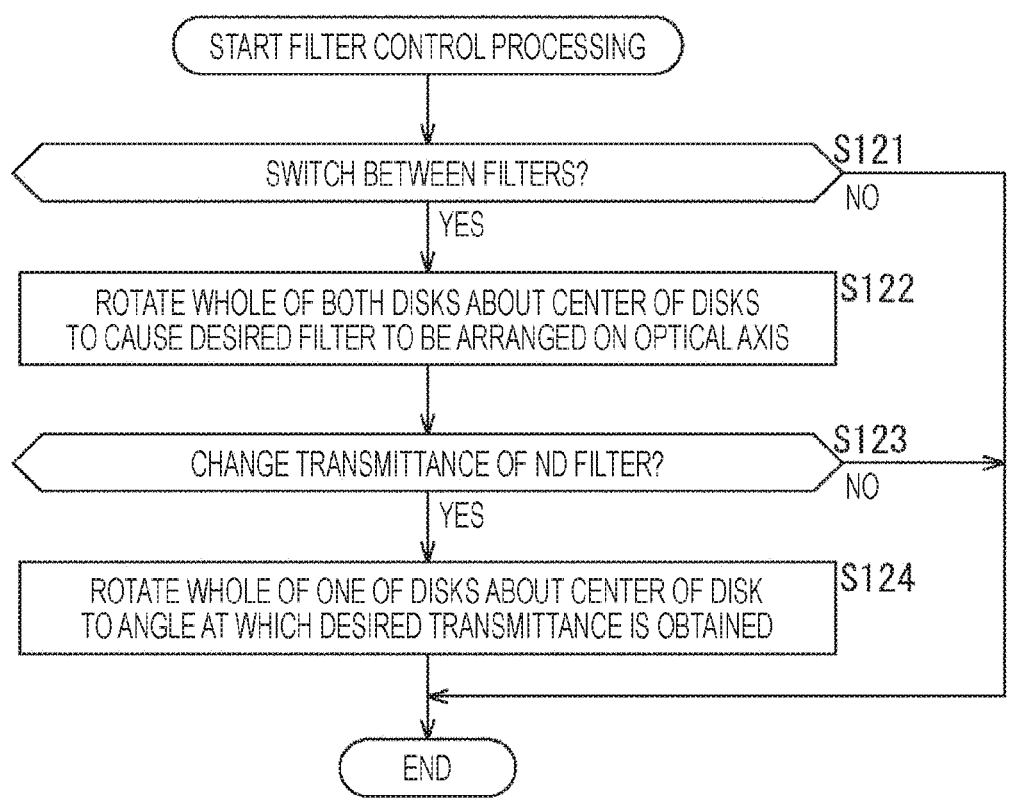
FIG. 17 is a flowchart illustrating an example of a flow of filter control processing.

Next, an example of a flow of filter control processing executed by the filter unit 100 in a case where the filter unit 100 having the configuration described in the second embodiment is used will be described with reference to a flowchart in FIG. 17.

When the filter control processing is started, the control unit 601 determines in step S121 whether or not to switch between filters. For example, in a case where it is determined that switching between filters should be performed on the basis of an instruction from a user or the like, the processing proceeds to step S122.

In step S122, the control unit 601 rotates the disk 101 and the disk 102 about the center of the disks (the disk rotation axis 151) to cause a desired filter to be arranged on the optical axis.

In step S123, the control unit 601 determines whether or not to change the transmittance of the ND filter. In a case where it is determined that the transmittance should be changed, the processing proceeds to step S124.

In step S124, the control unit 601 rotates the whole of one of the disks (for example, the disk 102) about the center of the disk 101 to an angle at which the ND filter has a desired transmittance. When the processing of step S124 ends, the filter control processing ends.

Furthermore, in a case where it is determined in step S121 that switching between filters should not be performed, the filter control processing ends. Furthermore, in a case where it is determined in step S123 that the transmittance of the ND filter should not be changed, the filter control processing ends.

The filter control processing as described above causes the filter unit 100 having the configuration described in the second embodiment to allow continuously changing a transmittance of an ND filter and switching between filters to be performed more easily.

<Flow of Filter Control Processing 3>

Figure 18:
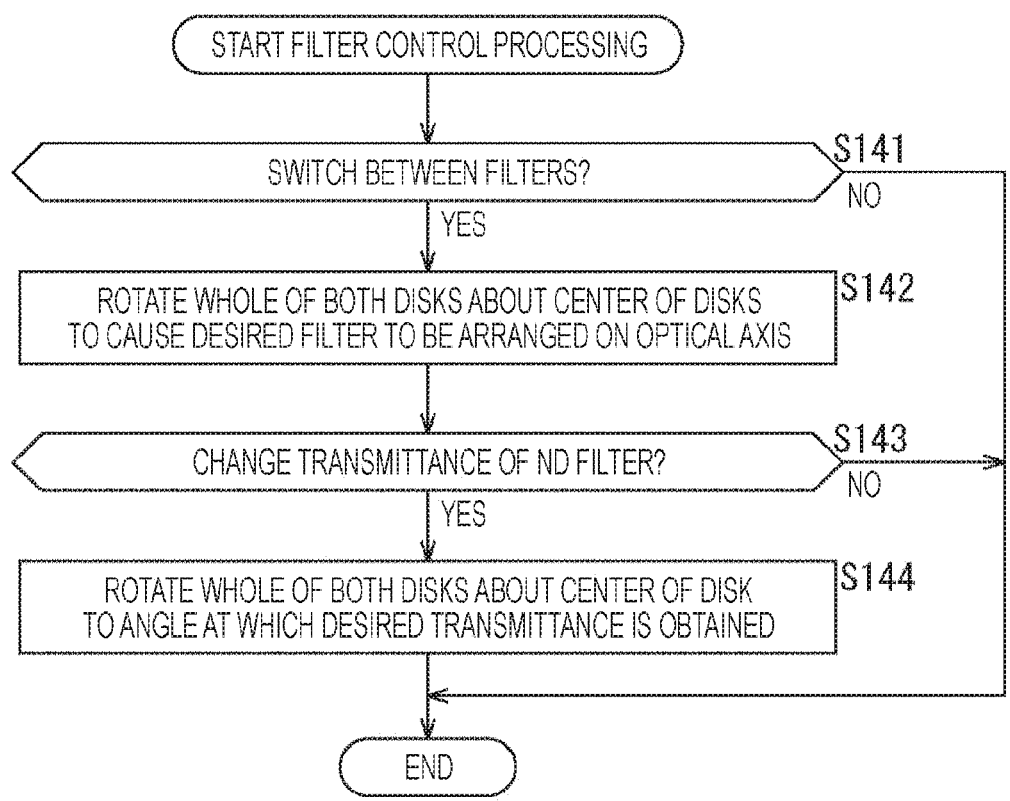
FIG. 18 is a flowchart illustrating an example of a flow of filter control processing.

Next, an example of a flow of filter control processing executed by the filter unit 100 in a case where the filter unit 100 having the configuration described in the third embodiment is used will be described with reference to a flowchart in FIG. 18.

When the filter control processing is started, the control unit 601 determines in step S141 whether or not to switch between filters. For example, in a case where it is determined that switching between filters should be performed on the basis of an instruction from a user or the like, the processing proceeds to step S142.

In step S142, the control unit 601 rotates the disk 101 and the disk 102 about the center of the disks (the disk rotation axis 151) to cause a desired filter to be arranged on the optical axis.

In step S143, the control unit 601 determines whether or not to change the transmittance of the ND filter. In a case where it is determined that the transmittance should be changed, the processing proceeds to step S144.

In step S144, the control unit 601 rotates the whole of the disk 101 and the disk 102 about the center of the disk 101 to an angle at which the ND filter has a desired transmittance. When the processing of step S144 ends, the filter control processing ends.

Furthermore, in a case where it is determined in step S141 that switching between filters should not be performed, the filter control processing ends. Furthermore, in a case where it is determined in step S143 that the transmittance of the ND filter should not be changed, the filter control processing ends.

The filter control processing as described above causes the filter unit 100 having the configuration described in the third embodiment to allow continuously changing a transmittance of an ND filter and switching between filters to be performed more easily.

<Other Controls>

As described above, remote control and automatic exposure adjustment can be performed by electrically controlling the continuously variable ND filter. In addition, it can be used as a function that allows continuous adjustment of the light intensity in addition to the iris, and this allows new operations in camera control.

For example, an iris-variable ND hybrid exposure adjustment function can be implemented. In this case, the filter frame is not reflected in an image, and the range of continuous exposure adjustment increases.

Furthermore, for example, exposure adjustment can be performed with the iris set so as not to be narrowed down beyond a certain level. This allows continuous exposure adjustment to be performed taking into consideration image quality deterioration caused by light diffraction due to an increase in resolution.

Moreover, for example, it is possible to implement an adjusting function in which only the depth of field is changed while the exposure is kept constant. For example, it is possible to perform control in which the brightness is increased by the iris and decreased by the variable ND at the same time.

As described above, the filter unit 100 to which the present technology is applied can be obtained by using a conventional turret type. Therefore, the filter unit 100 can be easily obtained without largely changing a structure of a conventional camera. Furthermore, in a case where the filter unit has a structure that is replaceable, the filter unit can be replaced with a conventional filter unit for use in accordance with the intended use.

Furthermore, in addition to a continuously variable ND filter, the filter unit 100 can be equipped with a through filter, an ND filter, a CC filter, or a video effect filter (for example, a cross filter, a diffusion filter, or the like). Consequently, it is possible to switch a filter to another filter more easily, without replacing the filter unit.

Note that, in the case described above, a plurality of polarization filters is used to obtain an ND filter having a continuously variable transmittance, but the present technology is not limited to this, and can also be applied to a filter unit that uses polarization filters. For example, a filter unit may include a single disk, and the disk may be constituted by a plurality of filters including a polarization filter. Furthermore, such a turret type polarization filter may be combined with a polarization filter having another configuration to obtain an ND filter having a continuously variable transmittance.

<6. Note>
<Computer>

The series of pieces of processing described above can be executed not only by hardware but also by software. In a case where the series of pieces of processing is executed by software, a program constituting the software is installed on a computer. Here, the computer includes a computer incorporated in dedicated hardware, or a general-purpose personal computer capable of executing various functions with various programs installed therein, for example.

Figure 19:
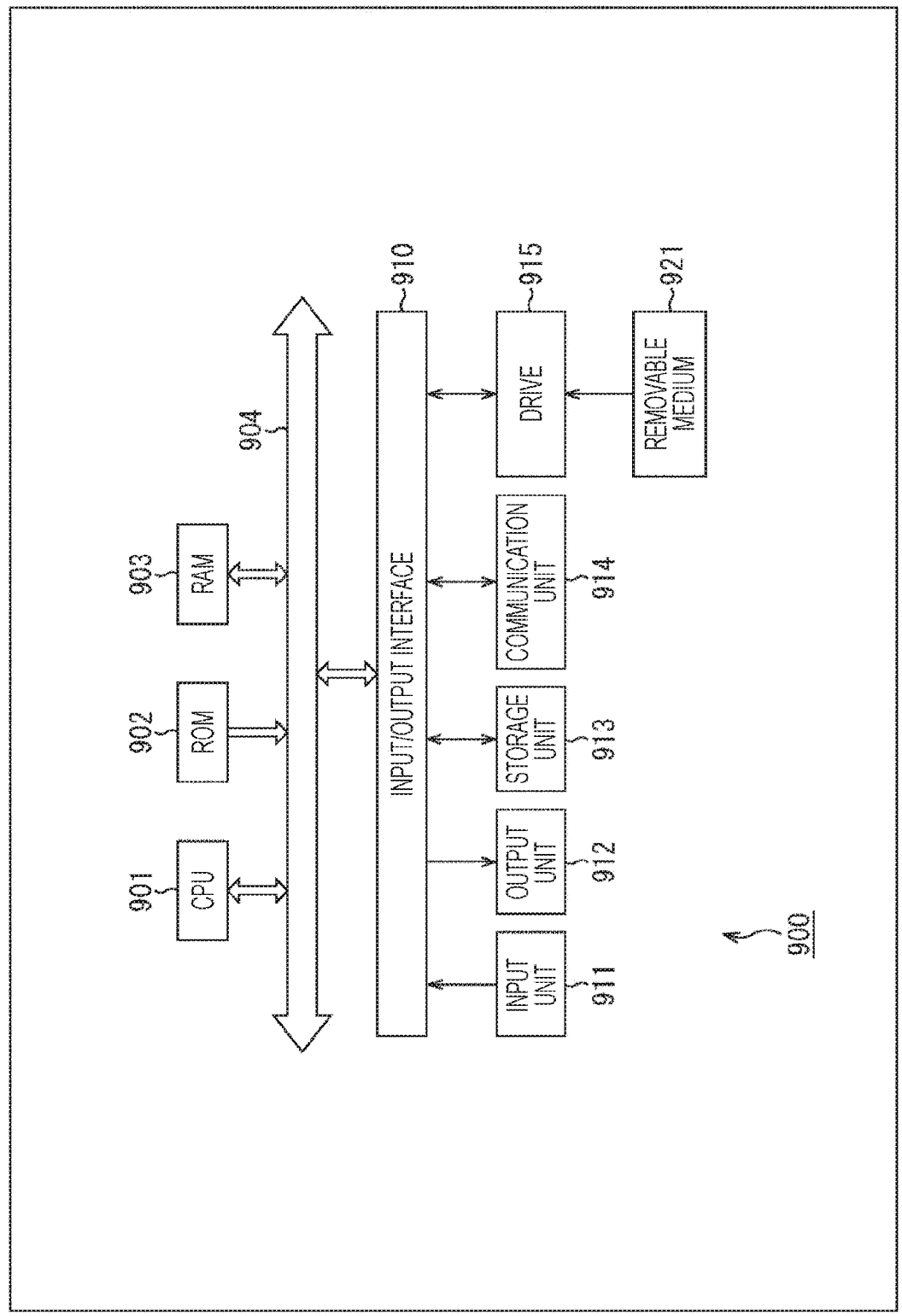
FIG. 19 is a block diagram illustrating an example of a main configuration of a computer.

FIG. 19 is a block diagram illustrating a configuration example of hardware of a computer that executes the series of pieces of processing described above in accordance with a program.

In a computer 900 illustrated in FIG. 19, a central processing unit (CPU) 901, a read only memory (ROM) 902, and a random access memory (RAM) 903 are connected to each other via a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal, or the like. The output unit 912 includes, for example, a display, a speaker, an output terminal, or the like. The storage unit 913 includes, for example, a hard disk, a RAM disk, a nonvolatile memory, or the like. The communication unit 914 includes, for example, a network interface. The drive 915 drives a removable medium 921 such as a magnetic disk, an optical disk, a magneto-optical disk, or a semiconductor memory.

To perform the series of pieces of processing described above, the computer configured as described above causes the CPU 901 to, for example, load a program stored in the storage unit 913 into the RAM 903 via the input/output interface 910 and the bus 904 and then execute the program. The RAM 903 also stores, as appropriate, data or the like necessary for the CPU 901 to execute various types of processing.

The program to be executed by the computer (CPU 901) can be provided by, for example, being recorded on the removable medium 921 as a package medium or the like. In that case, inserting the removable medium 921 into the drive 915 allows the program to be installed into the storage unit 913 via the input/output interface 910.

Furthermore, the program can also be provided via a wired or wireless transmission medium such as a local area network, the Internet, or digital satellite broadcasting. In that case, the program can be received by the communication unit 914 and installed into the storage unit 913.

In addition, the program can also be installed in advance in the ROM 902 or the storage unit 913.

<Applicable Targets of Present Technology>

Although the filter unit 100, the imaging device 500, and the like have been described above as application examples of the present technology, the present technology can be applied to any configuration.

For example, the present technology can also be carried out as a configuration of a part of a device such as a processor as a system large scale integration (LSI) or the like, a module using a plurality of processors or the like, a unit using a plurality of modules or the like, or a set in which other functions have been added to a unit. Furthermore, for example, the present technology can also be applied to a network system constituted by a plurality of devices. For example, the present technology may be carried out as cloud computing in which a plurality of devices shares and jointly performs processing via a network.

Note that, in the present specification, a system means a set of a plurality of components (devices, modules (parts), and the like), and it does not matter whether or not all components are in the same housing. Consequently, a plurality of devices housed in separate housings and connected via a network, and one device having a plurality of modules housed in one housing are both systems.

<Fields and Uses to which Present Technology can be Applied>

Systems, devices, processing units, and the like to which the present technology is applied can be used in any field such as transportation, medical care, crime prevention, agriculture, livestock industry, mining, beauty, factories, home appliances, weather, or nature monitoring. Furthermore, they can be used for any intended use.

For example, the present technology can be applied to systems and devices used for providing visual content and the like. Furthermore, for example, the present technology can also be applied to systems and devices provided for traffic, such as traffic condition management and autonomous driving control. Moreover, for example, the present technology can also be applied to systems and devices provided for security. Furthermore, for example, the present technology can be applied to systems and devices provided for automatic control of a machine or the like. Moreover, for example, the present technology can also be applied to systems and devices provided for agriculture and livestock industry. Furthermore, the present technology can also be applied to systems and devices that monitor, for example, a state of nature such as a volcano, a forest, or the ocean, or a wildlife or the like. Moreover, for example, the present technology can also be applied to systems and devices provided for sports.

<Others>

Embodiments of the present technology are not limited to the embodiments described above but can be modified in various ways within a scope of the present technology.

For example, a configuration described as one device (or processing unit) may be divided and configured as a plurality of devices (or processing units). Conversely, configurations described above as a plurality of devices (or processing units) may be combined and configured as one device (or processing unit). Furthermore, as a matter of course, a configuration other than those described above may be added to the configurations of the devices (or the processing units). Moreover, as long as the configuration and operation of the entire system remain substantially the same, a part of the configuration of a certain device (or processing unit) may be included in the configuration of another device (or another processing unit).

Furthermore, for example, the program described above may be executed by any device. In that case, the device is only required to have necessary functions (functional blocks and the like) and be able to obtain necessary information.

Furthermore, for example, the steps of one flowchart may be executed by one device, or may be shared and executed by a plurality of devices. Moreover, in a case where a plurality of pieces of processing is included in one step, the plurality of pieces of processing may be executed by one device, or may be shared and executed by a plurality of devices. In other words, a plurality of pieces of processing included in one step may be processed as a plurality of steps. Conversely, processing described as a plurality of steps may be collectively executed as one step.

Furthermore, for example, the program to be executed by the computer may be configured so that the steps described are processed in chronological order as described in the present specification, or the steps are processed in parallel or processed individually when needed, for example, when a call is made. That is, as long as no contradiction arises, the steps may be processed in an order different from the order described above. Moreover, the program may be configured so that processing of the steps describing is executed in parallel with processing of another program, or may be executed in combination with processing of another program.

Furthermore, for example, a plurality of technologies related to the present technology can each be carried out independently and individually as long as no contradiction arises. As a matter of course, any two or more technologies related to the present technology may be used together and carried out. For example, some or all of the technologies related to the present technology described in any one of the embodiments may be carried out in combination with some or all of the technologies related to the present technology described in another embodiment. Furthermore, some or all of any of the technologies related to the present technology described above may be carried out in combination with another technology that is not described above.

Note that the present technology can also be configured as described below.

(1) A filter unit including a disk provided with a plurality of filters including an ND filter having a continuously variable transmittance, in which a filter corresponding to a rotational orientation of the disk among the plurality of filters provided on the disk is arranged on an optical axis of incident light toward an image sensor.

(2) The filter unit according to (1), including a plurality of the disks arranged in a traveling direction of the incident light.

(3) The filter unit according to (2), in which the ND filter is a polarization filter.

(4) The filter unit according to (3), in which the plurality of disks each includes filters of the same types with those of other disks.

(5) The filter unit according to (4), in which the plurality of filters further includes, in addition to the ND filter, a through filter that does not optically affect the incident light that passes through the through filter.

(6) The filter unit according to (5), in which every one of the plurality of disks is driven to rotate, independently from each other, about a direction that passes through a center of a plane of the disk and is perpendicular to the plane, the polarization filter provided on at least one of the plurality of disks is driven to rotate, independently from rotational driving of the disk, about a direction that passes through a center of the polarization filter and is perpendicular to the plane, and the polarization filter rotates, on the optical axis of the incident light, about the direction that passes through the center of the polarization filter and is perpendicular to the plane, to change a relative angle between polarization directions of the polarization filter and a polarization filter provided on another one of the disks and cause a transmittance of the ND filter to change.

(7) The filter unit according to (6), in which
every one of the plurality of disks is driven to rotate about the direction that passes through the center of the plane of the disk and is perpendicular to the plane to cause filters arranged on the optical axis of the incident light to be switched to other filters.

(8) The filter unit according to (5), in which
every one of the plurality of disks is driven to rotate, independently from each other, about a direction that passes through a center of a plane of the disk and is perpendicular to the plane,
the polarization filter provided on at least one of the plurality of disks has a non-circular shape whose longitudinal direction is in a rotation direction of the disk, and
the polarization filter having the non-circular shape is driven to rotate, on the optical axis of the incident light, about the direction that passes through the center of the plane of the disk and is perpendicular to the plane to change a relative angle between polarization directions of the polarization filter and a polarization filter provided on another one of the disks and cause a transmittance of the ND filter to change.

(9) The filter unit according to (8), in which every one of the plurality of disks is driven to rotate about the direction that passes through the center of the plane of the disk and is perpendicular to the plane more largely than in a case of changing a transmittance of the ND filter, to cause filters arranged on the optical axis of the incident light to be switched to other filters.

(10) The filter unit according to (5), in which
every one of the plurality of disks is driven to rotate, independently from each other, about a direction that passes through a center of a plane of the disk and is perpendicular to the plane,
the polarization filter provided on every one of the plurality of disks has a non-circular shape whose longitudinal direction is in a rotation direction of the disk, and
the polarization filters having the non-circular shape are each driven to rotate, on the optical axis of the incident light, about the direction that passes through the center of the plane of the disk and is perpendicular to the plane to change a relative angle between polarization directions of the polarization filters and cause a transmittance of the ND filter to change.

(11) The filter unit according to (10), in which
every one of the plurality of disks is driven to rotate about the direction that passes through the center of the plane of the disk and is perpendicular to the plane more largely than in a case of changing a transmittance of the ND filter, to cause filters arranged on the optical axis of the incident light to be switched to other filters.

(12) The filter unit according to any one of (1) to (11), further including
a drive unit that drives the disk to rotate about a direction that passes through a center of a plane of the disk and is perpendicular to the plane.

(13) The filter unit according to (12), in which the drive unit drives the disk to rotate by applying a force to an outer peripheral portion of the disk.

(14) The filter unit according to (12) or (13), further including a control unit that controls rotational driving of the disk via the drive unit to achieve a desired rotational orientation of the disk.

(15) The filter unit according to (14), further including an orientation detection unit that detects a rotational orientation of the disk,
in which the control unit controls rotational driving of the disk in accordance with a result of detection by the orientation detection unit.

(16) A filter selection method including
rotating a disk provided with a plurality of filters including an ND filter having a continuously variable transmittance to cause a filter corresponding to a rotational orientation of the disk among the plurality of filters provided on the disk to be arranged on an optical axis of incident light toward an image sensor.

(17) An imaging device including:
an imaging unit that captures an image of a subject; and
a filter unit having a disk provided with a plurality of filters including an ND filter having a continuously variable transmittance, in which
a filter corresponding to a rotational orientation of the disk among the plurality of filters provided on the disk is arranged on an optical axis of incident light toward the imaging unit.

(18) The imaging device according to (17), in which
the filter unit is provided between the imaging unit and an ultraviolet cut filter that blocks ultraviolet components contained in the incident light.

(19) The imaging device according to (17) or (18), further including:
a drive unit that drives the disk of the filter unit to rotate about a direction that passes through a center of a plane of the disk and is perpendicular to the plane; and
a control unit that controls rotational driving of the disk via the drive unit to cause a desired filter to be arranged on the optical axis of the incident light.

(20) The imaging device according to (19), further including
an orientation detection unit that detects a rotational orientation of the disk,
in which the control unit controls rotational driving of the disk in accordance with a result of detection by the orientation detection unit.

REFERENCE SIGNS LIST

100 Filter unit
101 and 102 Disk
111 Polarization filter
112 to 114 Filter
131 Image sensor
151 Disk rotation axis
161 to 163 Drive unit
171 Polarization filter
172 to 174 Filter
201 Polarization filter
301 Polarization filter
500 Imaging device
511 Optical unit
513 Image processing unit
514 Display unit
515 Codec processing unit
516 Storage unit
517 Output unit
518 Communication unit
519 Sensor unit 521 Control unit
522 Operation unit
601 Control unit
613 Motor
614 Position detection unit
623 Motor
624 Position detection unit
900 Computer

The invention claimed is:

1. A filter unit, comprising:
a disk provided with a plurality of filters including a neutral density (ND) filter and having a continuously variable transmittance,
wherein a filter, corresponding to a rotational orientation of the disk among the plurality of filters provided on the disk, is arranged on an optical axis of incident light toward an image sensor, wherein
the disk is configured to rotate about a first direction that passes through a first center of a plane of the disk and is perpendicular to the plane, and
the ND filter is a polarization filter which is driven to rotate independently from rotational driving of the disk, about a second direction that passes through a second center of the polarization filter and is perpendicular to the plane.

2. The filter unit according to claim 1, comprising a plurality of the disks arranged in a traveling direction of the incident light.

3. The filter unit according to claim 2, wherein each of the plurality of the disks comprises filters of the same types with those of other disks.

4. The filter unit according to claim 2, wherein the plurality of filters further includes, in addition to the ND filter, a through filter that does not optically affect the incident light that passes through the through filter.

5. The filter unit according to claim 2, wherein
the plurality of the disks are driven to rotate, independently from each other, about the first direction that passes through the first center of the plane of the disk and is perpendicular to the plane,
the polarization filter provided on at least one of the plurality of the disks is driven to rotate, independently from the rotational driving of the disk, about the second direction that passes through the second center of the polarization filter and is perpendicular to the plane, and
the polarization filter is configured to rotate, on the optical axis of the incident light, about the direction that passes through the second center of the polarization filter and is perpendicular to the plane, to change a relative angle between polarization directions of the polarization filter and a polarization filter provided on another one of the disks and cause a transmittance of the ND filter to change.

6. The filter unit according to claim 2, wherein the plurality of the disks are driven to rotate about the first direction that passes through the first center of the plane of the disk and is perpendicular to the plane to cause filters arranged on the optical axis of the incident light to be switched to other filters.

7. The filter unit according to claim 2, wherein
the plurality of the disks are driven to rotate, independently from each other, about the first direction that passes through the first center of the plane of the disk and is perpendicular to the plane,
the polarization filter provided on at least one of the plurality of the disks has a non-circular shape whose longitudinal direction is in a rotation direction of the disk, and
the polarization filter having the non-circular shape is driven to rotate, on the optical axis of the incident light, about the first direction that passes through the center of the plane of the disk and is perpendicular to the plane to change a relative angle between polarization directions of the polarization filter and a polarization filter provided on another one of the disks and cause a transmittance of the ND filter to change.

8. The filter unit according to claim 7, wherein the plurality of the disks are driven to rotate about the first direction that passes through the first center of the plane of the disk and is perpendicular to the plane to cause filters arranged on the optical axis of the incident light to be switched to other filters.

9. The filter unit according to claim 2, wherein
the plurality of the disks are driven to rotate, independently from each other, about the first direction that passes through the first center of the plane of the disk and is perpendicular to the plane,
the polarization filter provided on each of the plurality of the disks has a non-circular shape whose longitudinal direction is in a rotation direction of the disk, and
the polarization filters having the non-circular shape are each driven to rotate, on the optical axis of the incident light, about the first direction that passes through the center of the plane of the disk and is perpendicular to the plane to change a relative angle between polarization directions of the polarization filters and cause a transmittance of the ND filter to change.

10. The filter unit according to claim 9, wherein the plurality of the disks are driven to rotate about the first direction that passes through the first center of the plane of the disk and is perpendicular to the plane to cause filters arranged on the optical axis of the incident light to be switched to other filters.

11. The filter unit according to claim 1, further comprising a drive unit that is configured to drive the disk to rotate about a direction that passes through the first center of the plane of the disk and is perpendicular to the plane.

12. The filter unit according to claim 11, wherein the drive unit is configured to drive the disk to rotate based on application of a force to an outer peripheral portion of the disk.

13. The filter unit according to claim 11, further comprising a control unit that is configured to control the rotational driving of the disk via the drive unit to achieve a desired rotational orientation of the disk.

14. The filter unit according to claim 13, further comprising an orientation detection unit that is configured to detect the rotational orientation of the disk,
wherein the control unit is configured to control the rotational driving of the disk in accordance with a result of detection by the orientation detection unit.

15. A filter selection method, comprising:
rotating a disk provided with a plurality of filters including a neutral density (ND) filter and having a continuously variable transmittance to cause a filter, corresponding to a rotational orientation of the disk among the plurality of filters provided on the disk, to be arranged on an optical axis of incident light toward an image sensor, wherein the disk rotates about a first direction that passes through a first center of a plane of the disk and is perpendicular to the plane, and the ND filter is a polarization filter which is driven to rotate independently from rotational driving of the disk, about a second direction that passes through a second center of the polarization filter and is perpendicular to the plane.

16. An imaging device, comprising:

an imaging unit that captures an image of a subject; and a filter unit having a disk provided with a plurality of filters including a neutral density (ND) filter and having a continuously variable transmittance, in which a filter, corresponding to a rotational orientation of the disk among the plurality of filters provided on the disk, is arranged on an optical axis of incident light toward the imaging unit, wherein the disk is configured to rotate about a first direction that passes through a first center of a plane of the disk and is perpendicular to the plane, and the ND filter is a polarization filter which is driven to rotate independently from rotational driving of the disk, about a second direction that passes through a second center of the polarization filter and is perpendicular to the plane.

17. The imaging device according to claim 16, wherein the filter unit is provided between the imaging unit and an ultraviolet cut filter that is configured to block ultraviolet components contained in the incident light.

18. The imaging device according to claim 16, further comprising:

a drive unit that is configured to drive the disk of the filter unit to rotate about the first direction that passes through the first center of the plane of the disk and is perpendicular to the plane; and a control unit that is configured to control the rotational driving of the disk via the drive unit to cause one of the plurality of filters to be arranged on the optical axis of the incident light.

19. The imaging device according to claim 18, further comprising an orientation detection unit that is configured to detect the rotational orientation of the disk, wherein the control unit is configured to control the rotational driving of the disk in accordance with a result of detection by the orientation detection unit.

20. The filter unit according to claim 1, wherein each of the plurality of filters is the ND filter.

21. The filter unit according to claim 1, wherein the plurality of the filters further includes, in addition to the ND filter, a cross filter that is configured to add a four-point star effect to the incident light, and a bandpass filter that is configured to allow the incident light in a wavelength range to pass through the filter.

22. The filter unit according to claim 2, wherein each of the plurality of the disks includes the polarization filter, and shape of the polarization filter of each of the plurality of the disks is different.

23. The filter unit according to claim 1, wherein the first direction and the second direction are different, and the first center and the second center are different.

* * * * *